US012268946B2

(12) United States Patent
DeGooyer et al.

(10) Patent No.: US 12,268,946 B2
(45) Date of Patent: Apr. 8, 2025

(54) MEDIA PLATFORM FOR EXERCISE SYSTEMS AND METHODS

(71) Applicant: Peloton Interactive, Inc., New York, NY (US)

(72) Inventors: Paul DeGooyer, New York, NY (US); Akshay Kashyap, New York, NY (US)

(73) Assignee: Peloton Interactive, Inc., New York, NY (US)

( * ) Notice: Subject to any disclaimer, the term of this patent is extended or adjusted under 35 U.S.C. 154(b) by 376 days.

(21) Appl. No.: 17/497,848

(22) Filed: Oct. 8, 2021

(65) Prior Publication Data

US 2022/0023739 A1 Jan. 27, 2022

Related U.S. Application Data

(63) Continuation of application No. PCT/US2020/067757, filed on Dec. 31, 2020.

(Continued)

(51) Int. Cl.

*A63B 22/06* (2006.01)
*A63B 24/00* (2006.01)
*A63B 71/06* (2006.01)
*G06F 16/435* (2019.01)
*G06F 16/438* (2019.01)

(Continued)

(52) U.S. Cl.

CPC ...... *A63B 71/0622* (2013.01); *A63B 24/0006* (2013.01); *A63B 24/0062* (2013.01); *A63B 24/0075* (2013.01); *A63B 71/0616* (2013.01); *G06F 16/436* (2019.01); *G06F 16/4393* (2019.01); *G06N 3/02* (2013.01); *H04N 21/25875* (2013.01); *H04N 21/266* (2013.01); *A63B 2024/0009* (2013.01); *A63B 2024/0068* (2013.01); *A63B 2024/0081* (2013.01);

(Continued)

(58) Field of Classification Search

CPC ........................ A63B 71/0622; A63B 71/0619

See application file for complete search history.

(56) References Cited

U.S. PATENT DOCUMENTS

2002/0111878 A1* 8/2002 Namba ............ H04N 21/63345 705/26.8

2013/0228063 A1* 9/2013 Turner ..................... G10H 7/00 84/612

(Continued)

*Primary Examiner* — Hsiungfei Peng

(74) *Attorney, Agent, or Firm* — AMPACC Law Group, PLLC

(57) ABSTRACT

Systems and methods for delivering exercise content to a user of an exercise apparatus include a database storing exercise content, data associated with a content provider and data associated with an application provider, and a platform server operable to facilitate delivery of the exercise content to the exercise apparatus. The platform server delivers for display on the exercise apparatus archived exercise classes for selection by the user, receives from the exercise apparatus a selection, transmits data representing content of the selected archived exercise class, receives performance data from the exercise apparatus based on activity by the user, and generates archived performance data representing archived user performance parameters for a plurality of other users over at least the portion of the selected archived exercise class. Data is synchronized and updated for display by the exercise apparatus to simulate the user competing with at least some of the other users.

18 Claims, 14 Drawing Sheets

Related U.S. Application Data

(60) Provisional application No. 62/956,588, filed on Jan. 2, 2020.

(51) Int. Cl.

| | |
|---|---|
| ***G06F 16/635*** | (2019.01) |
| ***G06F 16/638*** | (2019.01) |
| ***G06F 16/735*** | (2019.01) |
| ***G06N 3/02*** | (2006.01) |
| ***G06Q 30/06*** | (2023.01) |
| ***G06Q 50/10*** | (2012.01) |
| ***H04N 21/258*** | (2011.01) |
| ***H04N 21/266*** | (2011.01) |

(52) U.S. Cl.

CPC ................. *A63B 2071/0625* (2013.01); *A63B 2071/0644* (2013.01)

(56) References Cited

U.S. PATENT DOCUMENTS

| | | | | |
|---|---|---|---|---|
| 2013/0312589 | A1* | 11/2013 | MacPherson | G10H 1/46 84/612 |
| 2014/0223099 | A1* | 8/2014 | Kidron | G06F 16/435 711/118 |
| 2016/0292271 | A1* | 10/2016 | Kim | G10H 1/40 |
| 2021/0205689 | A1* | 7/2021 | Putnam | G09B 19/0038 |

* cited by examiner

830

832

| SEGMENT | LENGTH | SONG | ARTIST |
|---|---|---|---|
| 1. Cycling Warmup | hh:mm:ss | song title | artist name |
| 2. Cycling | hh:mm:ss | song title | artist name |
| 3. Cycling Cool Down | hh:mm:ss | song title | artist name |

834

Add Segment    Save

CLASS PLAN

Ride Title

Instructor Name

Creation date/time

Workout Description
hh:mm:ss

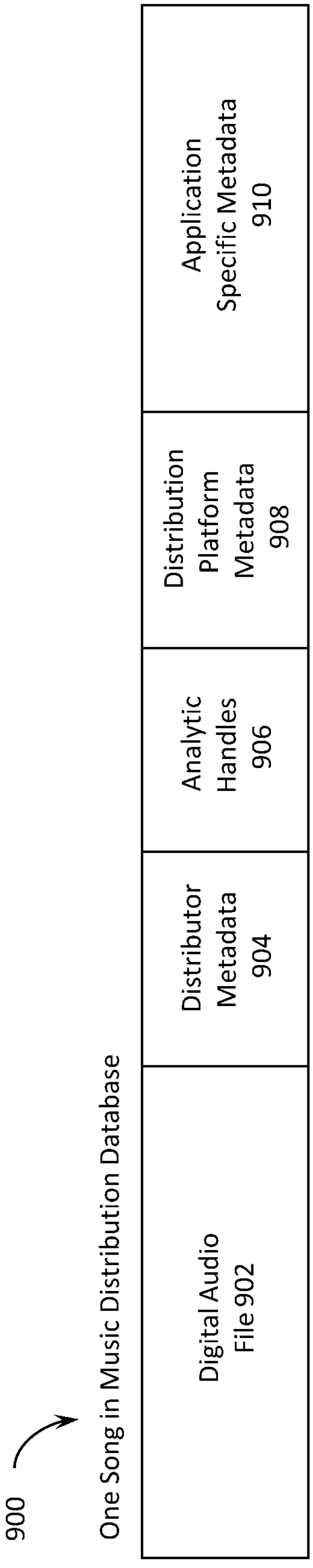

FIG. 9A

Application Specific Metadata 910

| | | | | | | | | | |
|---|---|---|---|---|---|---|---|---|---|
| 920 | **Spin-Warmup** | **Spin-Climb** | **Spin-Arms** | **Spin-Overall** | **Spin-Cooldown** | **Spin-Preshow** | **Bootcamp-Warmup** | **Bootcamp-Sprint** | **Bootcamp-Floor** |
| 922 | Rating: 2 | Rating: 10 | Rating: 2 | Rating: 2 | Rating: 2 | Rating: 2 | Rating: 2 | Rating: 2 | Rating: 2 |

| | | | | | | | | | |
|---|---|---|---|---|---|---|---|---|---|
| 920 | **Outdoor-Warmup** | **Outdoor-Sprint** | **Outdoor-Cooldown** | **Yoga-Warmup** | **Yoga-Savasana** | **Yoga-Wiggling** | **Meditation-Freaking Out** | **Meditation-Focus** | **Meditation-Breath** |
| 922 | Rating: 3 | Rating: 9 | Rating: 2 | Rating: 5 | Rating: 0 | Rating: 3 | Rating: 9 | Rating: 2 | Rating: 0 |

FIG. 9B

MEDIA PLATFORM FOR EXERCISE SYSTEMS AND METHODS

CROSS-REFERENCE TO RELATED APPLICATIONS

This application is a continuation of International Patent Application No. PCT/US2020/067757, filed Dec. 31, 2020 and entitled "MEDIA PLATFORM FOR EXERCISE SYSTEMS AND METHODS," which claims priority to and the benefit of U.S. Provisional Patent Application No. 62/956,588 filed Jan. 2, 2020 and entitled "MEDIA PLATFORM FOR EXERCISE SYSTEMS AND METHODS," which are all hereby incorporated by reference in their entirety.

TECHNICAL FIELD

The present disclosure relates generally to media production, distribution and use and more particularly, for example, to a media platform for the production, distribution and use of media, such as music, with exercise systems and methods.

BACKGROUND

Digital media may include electronic files containing digital data such as audio, video, audio-video, multimedia, music, graphics, data or any other type of media-related content. Digital media may be stored, embodied and/or delivered in a variety of electronic formats. For example, a digital media asset can be a music download that a recording company or musical group produces or creates for playback on a user's device (e.g., a smartphone with headphones), content generated and/or streamed live to a user, or other digital media content.

Digital media assets are often managed through one or more servers accessible via a network such as the Internet or a wireless network. A content owner may use the servers to control and monetize the distribution and use of the digital media assets. Conventional systems are designed to support traditional media use and distribution (e.g., an end user purchasing a copy of a digital media asset such as a song for playback on the end user's device) and are often limited to existing business models and limitations of the processing, storage, licensing and management systems associated with the digital media server. Thus, there exists a need for improved systems and methods for efficiently managing the creation, management, monetization and distribution of digital media assets.

There also exists a need for systems and methods for efficiently managing the creation, management, monetization, and distribution of digital media assets for use with exercise systems and methods. Such a system should be compatible with a wide variety of file formats accessed from a variety of content providers, servers and platforms, allowing control of the digital media asset by the content owner, intermediary service providers such as class instructors, and/or the end-user.

Conventional systems and methods lack efficient reporting, fee collection, digital rights management and other features that can take advantage of new distribution models and services that utilize digital content. For example, an exercise content delivery system may provide user selectable live and/or archived exercise class content (e.g., video and audio of an instructor teaching the class, music, etc.), for delivery to a plurality of exercise devices, such as a stationary cycle or a treadmill. A challenge for content providers to is efficiently control the management and distribution of digital media content and the collection of revenue, while opening access of the digital media content to new business and use models.

In light of the above, there exists a need for systems and methods for the efficient production, management, distribution and monetization of digital media assets through a network such as the Internet or wireless networks. There is a need, for such systems and methods to enable digital content owners, digital media aggregators/intermediaries, and end-users to control, access and/or use a variety of digital media content through an efficient interface.

SUMMARY

The present disclosure provides systems and methods related to the creation, management, distribution, monetization and consumption of digital media assets. In some embodiments, improved systems and methods facilitate specialized content creation, delivery and consumption in an exercise environment, with control and reporting at each stage of distribution.

In some embodiments, systems and methods for delivering exercise content to a user of an exercise apparatus include a database storing exercise content, data associated with a content provider and data associated with an application provider, and a platform server operable to facilitate delivery of the exercise content to the exercise apparatus. The platform server delivers for display on the exercise apparatus archived exercise classes for selection by the user, receives from the exercise apparatus a selection, transmits data representing content of the selected archived exercise class, receives performance data from the exercise apparatus based on activity by the user, and generates archived performance data representing archived user performance parameters for a plurality of other users over at least the portion of the selected archived exercise class. Data is synchronized and updated for display by the exercise apparatus to simulate the user competing with at least some of the other users.

In various embodiments, a content distribution system providing media content to a user of an exercise apparatus, the content distribution system comprises a media database storing the media content, data associated with a content provider, and data associated with an application provider, a content management server configured to receive a media asset request from the user of the exercise apparatus associated with project and distribute the requested media asset in accordance with parameters established by content owners and compatible with the exercise apparatus, and a content distribution platform communicably coupled to the media database and configured to facilitate creation and delivery of the media content to the exercise apparatus.

In some embodiments, a method for delivering exercise content to a user of an exercise apparatus, the method comprises storing, in a media database, media content, data associated with a content provider, and data associated with an application provider, receiving, through a content management server, a media asset request from the user of the exercise apparatus associated with project and distribute the requested media asset in accordance with parameters established by content owners and compatible with the exercise apparatus, and facilitating creation and delivery of the media content to the exercise apparatus through a content distribution platform communicably coupled to the media database.

The scope of the disclosure is defined by the claims, which are incorporated into this section by reference. A more complete understanding of embodiments of the disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 9A and 9B illustrate example song-level metadata for use with one or more embodiments of the exercise systems and music platforms of the present disclosure.

DESCRIPTION OF DISCLOSED EMBODIMENTS

Systems and methods according to embodiments of the disclosure provide for the management, distribution, and use of digital media content for end-user systems, including exercise-based systems. The systems and methods allow for efficient use of processing and/or storage capacity for managing, distributing and reporting use of digital media assets distributed through one or more networks, such as a wireless mobile network, the cloud, and/or the Internet. The systems and methods include improved access and handling of digital media assets by content owners, content aggregators, content integrators, and end-users, including improved management and reporting for exercise systems and methods.

At a high level, the rights to digital content, such as music, is controlled by record labels who control the actual sound recording, publishers who control the underlying compositions, and performance rights organizations who control the public performance of compositions. There is no central database of music and the ownership and licensing information is difficult to aggregate. As described herein, a digital content owner or licensor includes entities that provides digital media assets such as music files, video files, and other content to a distributor, digital media content integrator and/or end-user. The owner and/or licensor can impose specific user limitations on the content of its digital media assets such as the duration of play, number of plays, types of distribution, quality, and licensing fees, which are managed through the system and methods disclosed herein.

The systems and methods disclosed herein may connect to a variety of devices and applications, including an online store, online music outlet, a web portal, an application through a connected exercise apparatus, a mobile application, or another entity or device that distributes or consumes digital media assets, for example. For example, a user of an exercise apparatus may access exercise content through the Internet that includes instructor led classes, music, video, and/or workouts. The exercise content may be customizable by the end-user through the exercise device and/or an associated application service. The exercise content may include digital media content created by a third party (e.g., an exercise instructor) that includes licensed digital media content such as music and video for delivery to the user, integrated with content-based metadata and performance-based metadata. An end-user may access the digital media assets while using an exercise device, via one or more models such as an exercise subscription with access to exercise classes, customizable content via an application interface, or other service.

Figure 1:
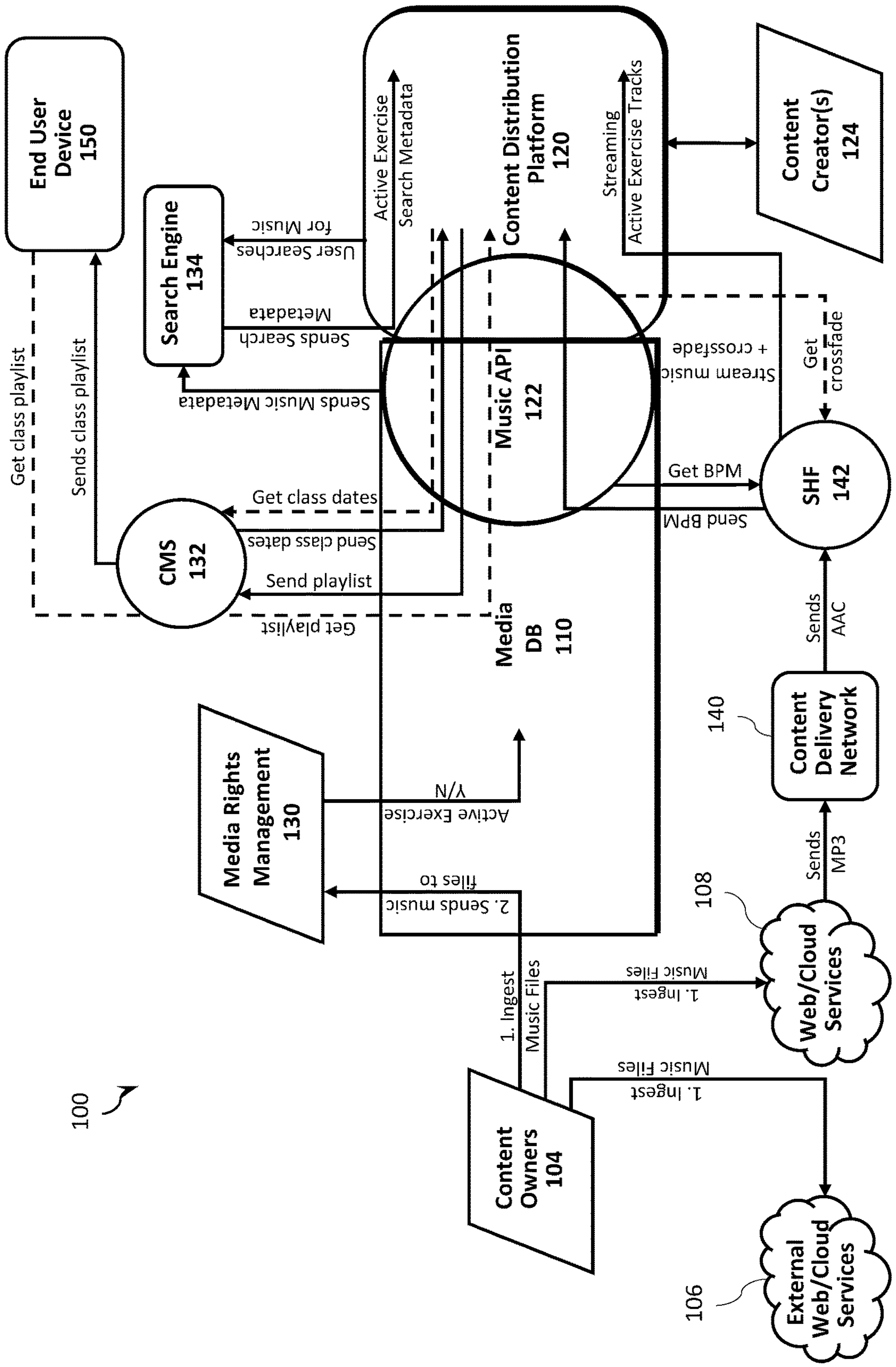
FIG. 1 is an example embodiment of a digital content distribution system for use in an exercise environment, in accordance with one or more embodiments.

Referring to FIG. 1, an example digital content distribution system 100 will now be described in accordance with one or more embodiments of the present disclosure. The system 100 allows for improved music and media content distribution models that are suitable for use in exercise equipment and other devices. Fitness instructors, for example, can create music playlists that accompany live or archived audio-visual fitness classes, which may be accessed by end-users through a content distribution platform 120.

The content distribution platform 120 facilitates the creation of content for the end user device 150, such as an exercise class for playback on a display associated with a stationary exercise cycle, treadmill or other exercise device. The content distribution platform 120 is communicably coupled to a music database 110 through a music application programming interface (music API 122), for example. A content creator 124 may access the content distribution platform 120 to create a media project comprising one or more media assets. For example, an exercise instructor may create a music playlist for an exercise class that includes music owned and licensed by content owners 104. The content distribution platform 120 facilitates the clearance of the media rights, creation of a project for access by an end user device and tracking and reporting of each media asset used. The end user may request media assets associated with a selected project (e.g., an exercise class), which may be distributed in accordance with parameters established by content owners 104 and compatible with the end user device 150.

In various embodiments, the system 100 populates and maintains a media database 110 of digital media assets, including the digital media content in one or more formats, distribution and licensing parameters, and associated metadata describing the media content. The content distribution platform 120 facilitates the allocation of one or more media assets stored in the media database 110 to one or more projects. The content distribution platform 120 provides an interface between the media database 110, content owners 104, content creators 124 and end user devices 150, including reconciling parameters for content creation and distribution that are compatible with the end user device 150, the intended user of the media asset, and the distribution and pricing parameters established by the content owners 104. The content creator 124 can create new content and incorporate media assets from the media database 110 (e.g., music) that meet the parameters controlled by content owners 104. In various embodiments, the created content may include live and/or archived content incorporating a digital media asset owned by the content owners 104. For example, a live exercise class may include music delivered to end users for playback on an end user device.

Figure 2:
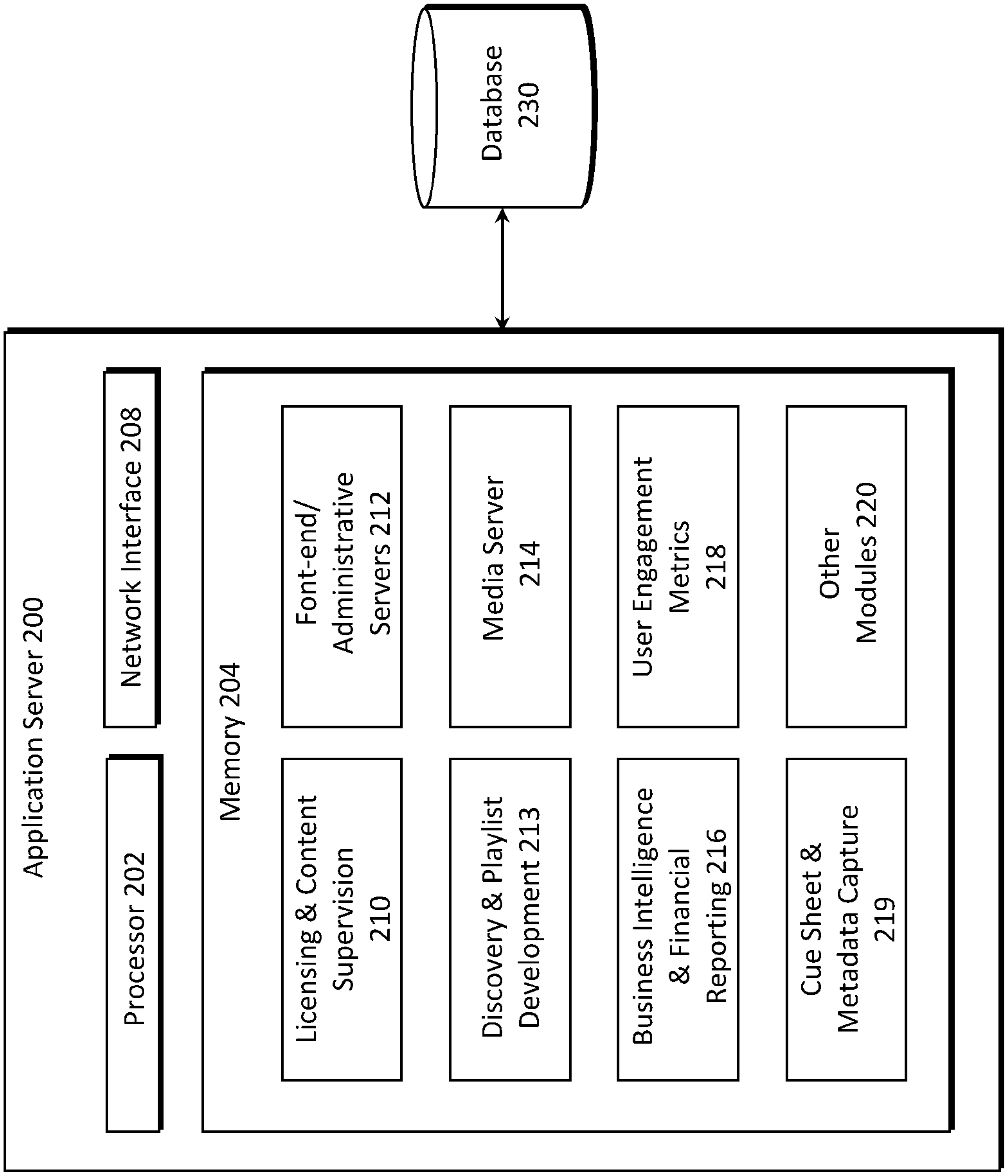
FIG. 2 is a block diagram of an application server for the distribution of digital media in accordance with an embodiment of the present disclosure.

As illustrated, the system 100 may access media content from content owners 104 (e.g., content owners, licensors, publishers, etc.) through a network interface (e.g., network interface 208 of FIG. 2). Media content may be controlled, for example, by the entity that creates, owns, and/or is the licensor of the digital media asset(s) to be distributed. The content and/or related content and data may be hosted in one or more content host servers, such as a server accessible through an external web or cloud service 106 and/or a web or cloud service 108.

The content distribution platform 120 may be implemented on one or more application servers, cloud servers, network servers, or other computing system. It will be appreciated that the software platform may reside on any computing system appropriately linked to the remainder of the system element(s). The system may also include an interface to media right management services 130, which are configured to track and collect royalties. The content management system (CMS) 132 is configured to facilitate the delivery of content to the end user device 150. The end user device 150 may include end-user computing devices operable to interface with the CMS 132 and may include computer(s), portables (including mobile smart phones), wearables, televisions, smart speakers, exercise equipment, or other devices (e.g., automobiles) to which the media asset(s) may be distributed.

Communications between the various components of the system may take place over a communications network, such as the Internet and/or a mobile network. It will be appreciated, that any communications network (e.g., wired, wireless, cellular, wide area network, local area network) and communications path (e.g., Bluetooth connection) suitable for facilitating communications between the components as described herein may be used.

In some embodiments, an end user operates the end user device 150 to access classes available through the content management server 132. For example, the exercise apparatus may include a touchscreen display that lists available classes for selection. The end user device may request a class playlist from the CMS 132, which delivers the class playlist to the end user device 150. In some embodiments, the CMS 132 gets the playlist from the content distribution platform 120, which sends the playlist to the CMS 132. The CMS 132 and content distribution platform 120 may also exchange class dates and other class information. In some embodiments, the end user and/or the end user device 150 has associated identifying information (e.g., account name, password, Internet Protocol Address (IP address) of the end-user device, cookies, etc.).

The system 100 also includes a search engine 134 that facilitates searches for music through enriched metadata fields from the music database 110 in accordance with class parameters, user preferences, instructor preferences, etc. to select appropriate music for the exercise session. In various embodiments, the content creator(s) 124 can exploit the media assets database 110 to create end-user offerings, such as exercise classes that include a mix of instruction, music and video. Content creator(s) 124 can view the usage rules provided by the owner and per asset, and model their end-user offerings accordingly. The content creators 124 can control their end-user experience, pricing, and offerings, including end user customizations.

The search engine 134 facilitates a search for music content based, for example, on instructor preferences and content restrictions from the content owners 104. In some embodiments, the music database 110 stores the associate metadata for the music allowing a search for appropriate content to be selected. For example, there may be a territorial restriction on one or more requested digital media asset. The content owner may desire that a particular media asset be distributed in the United States but not in any of the countries of Europe or Asia. Information regarding territorial restrictions may be provided to the platform music database 110 and content distribution platform 120 by the content owner or licensor (e.g., content owners 104) and stored in the music database 110 prior to distribution.

If the search engine 134 determines that the music asset exists in the database and is available to the end user device through the request, then the process proceeds to provide the identified content to the user. In some embodiments, the music database 110 stores project information associated with a request, including a plurality of music assets, uses within the project, royalty information, etc. In some embodiments, the search may include a determination of whether the user and/or user device has an active subscription or other appropriate authorization to access the requested content. If not, a user interface may be presented to the end user to establish a membership, provide payment authorization, or other options.

An operation of the system 100 will now be described with reference to an active exercise system. The music database 110 and content distribution platform 120 manage communications between the content owners and/or licensors (e.g., content owner 104) and media right management system 130 on the one hand and a network of content creators 124 on the other hand. The content creators 124 (e.g., exercise instructor creating an exercise class) create and deliver content to end user devices 150 (e.g., an exercise apparatus) over a communications network.

As illustrated, the respective owners and/or licensors may communicate with the media database 110 and/or other content hosts. The content owners 104 provide access to music files to one or more network accessible platforms. As illustrated, music assets are provided to a web or cloud service 108 for delivery of music files (e.g., MP3 files) to a content delivery network 140. The content delivery network 140 sends the music content in an appropriate format (e.g., AAC) to an application server (e.g., SHF 142) to modify the music content in accordance with a desired factor, which may include generating metadata for desired features such as a tempo. In one embodiment, the SHF 142 server utilizes a "something to hold onto factor" or other music characteristics to determine music attributes and/or visual accompaniments to engage the user in the exercise experience. For example, if an exercise class establishes a certain tempo then selecting song and/or playing the music at the tempo appropriate for the class may be desirable. In some embodiments, the system 100 provides a music tempo to the content distribution platform and receives a desired beats-per-minute and crossfade information. The SHF 142 may then stream the selected music having the appropriate tempo for the exercise class.

In some embodiments, the digital media assets are provided in an encrypted form, including certain restriction(s) placed on the end user's use of the particular media asset(s), such as a limit in use to a time period selected by the owner/licensor. This may be useful, for example, in a situation where rights are granted for an exercise class and the owner wishes to provide the license on a one time use basis for the class and/or for a usage rights set to expire after a fixed period of time (e.g., thirty (30) days). Additional usage rules are available within various digital rights management software.

In some embodiments, the content owners may include various business attributes with their content submissions, such as, on a per-media-asset basis (i) their territorial flags for countries in which the media asset may be exploited, (ii) for each such country or territory, their price for a sale of the product in local currency and numeric value, (iii) their allowance for the product to be included in subscriptions in that territory, and other content, pricing and distribution information. In some cases, the content owner may designate unique business attributes for only one or a few outlets available through the content distribution platform. Other manageable parameters include, and are not limited to, digital rights management terms, crypto-currency terms, suggested retail price (SRP), start date and end date for various attributes, etc.

The systems and methods disclosed herein can be embodied in a website that operates via the Internet or another network such as a wireless network. An example application server 200 that implements an embodiment of a distribution platform of the present disclosure is illustrated in FIG. 2. In one embodiment, the application server 200 facilitates a website that executes on a processor-based platform, such as a network server, that can be hosted by a system administrator or another administrative entity. The system may include one or more processors 202, memory components 204, and a database 230. The platform may include software instructions stored in the memory 204 for execution by the processor 202, including various logical components and processes as disclosed herein. In some the embodiments, the platform includes a content management module including digital rights management (e.g., licensing & content supervision module 210), a front-end server and administrative servers 212, a media server 214 (e.g., a Windows Media server) enabling playback and/or audio capture, a module 213 providing content discovery and playlist development, business intelligence and financial reporting module 216 configured to track and report distribution and licensing data, a user engagement metrics module 218 configured to gather and analyze data associated with the effectiveness of the music selection on the user performance, a cue sheet and metadata capture module 219 for use in generating projects, and other modules 220.

In various embodiments, the application server 200 is configured to facilitate the production, hosting, and delivering of digital assets in accordance with the disclosure. The platform may be further configured for the production, administration, and monitoring of one or more projects and membership plans for one or more partners so that the partners can expose and deliver digital assets or content to one or more end-users. Finally, the platform may be configured for the generation of detailed reports on all activities involving the production, hosting, delivering of digital assets including the production, administration, and monitoring of one or more digital assets.

The database 230 and administration modules (e.g., module 212) are configured to host digital assets such as media files, deliver digital assets, and manage licenses provided for the digital assets. For example, the database 230 or administration modules 212 can provide a license and reporting only service, whereby a specific distributor can host particular digital assets on its own servers and deliver the files independently. The content management module 210 may include functionality to control and monitor the bandwidth, download rate, streaming plays, and maximum volume caps for all, or a portion of, the digital assets that are managed by the system. This functionality provides careful control of budgetary constraints that may be placed on an associated client and any related digital assets.

The methods of the present disclosure may include a pricing provision where the price to the content creator, or a subset thereof, is charged as a percentage of total revenue. The systems disclosed herein include the delivery of the digital content structured as a business-to-business-to-consumer eco-system between a content owner, a content creator and a subscriber/end-user. The system disclosed herein provides a single platform between the various parties that allows, through a single access for each stakeholder, the ability to provide control over distributed content.

Figure 3:
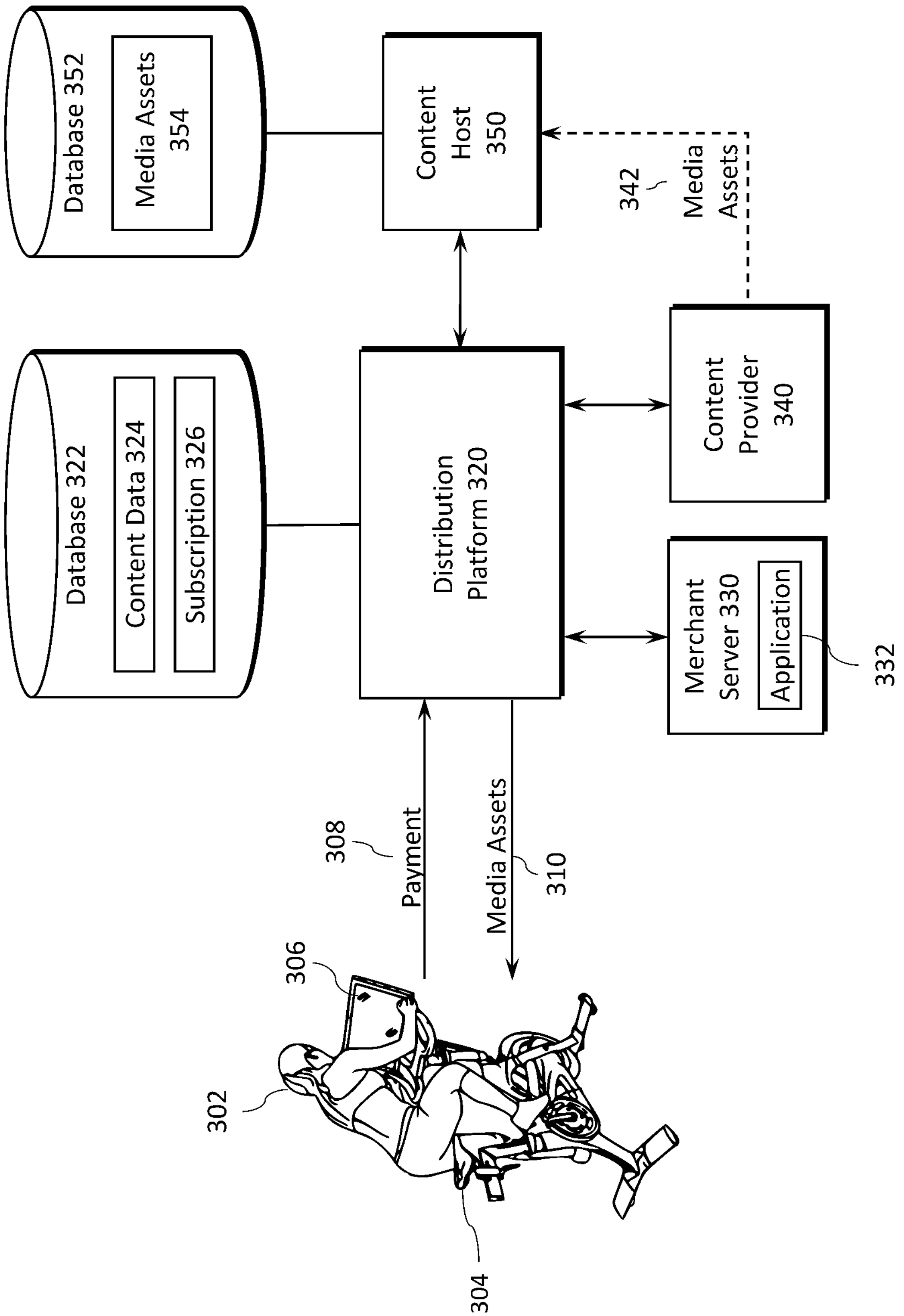
FIG. 3 is a dataflow diagram of a computing environment for the distribution of digital media using crypto-currency in accordance with an embodiment of the present disclosure.
Figure 4A:
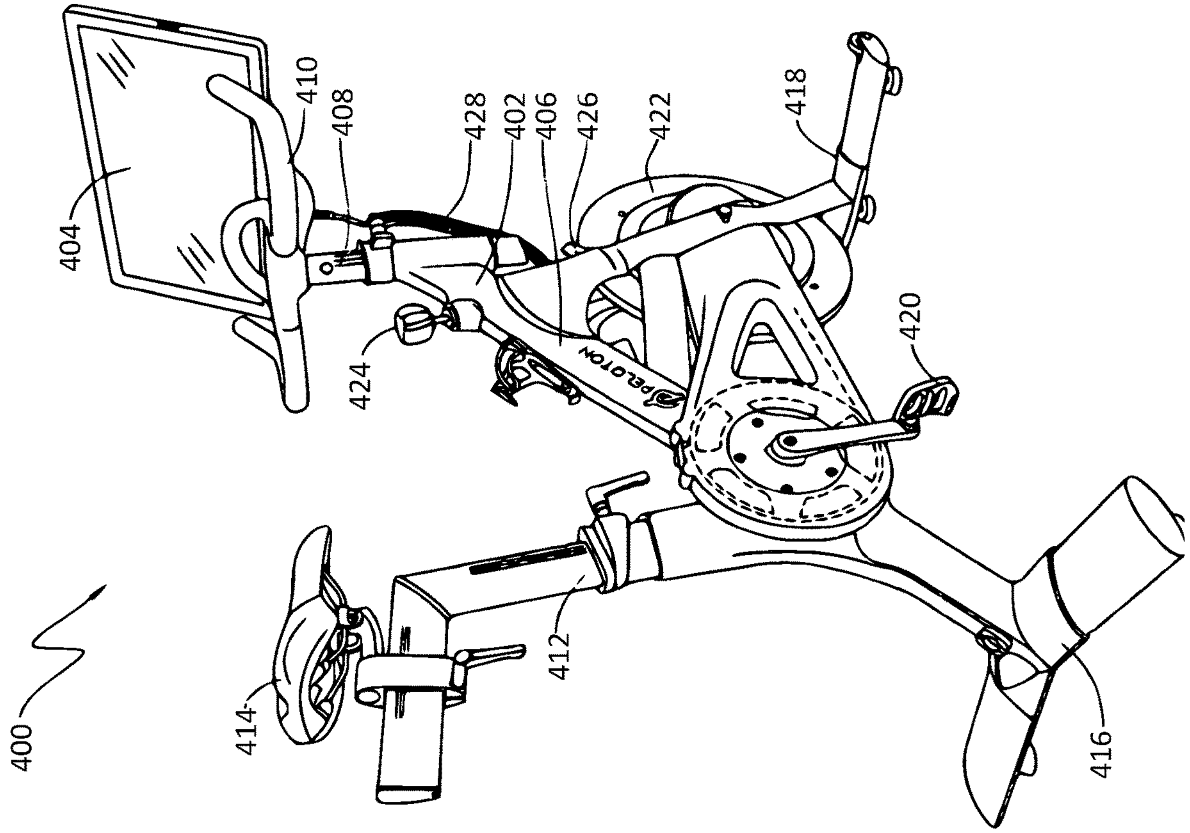
FIGS. 4A and 4B are rear perspective views of an example a stationary bike, in accordance with an embodiment the present disclosure.
Figure 4B:
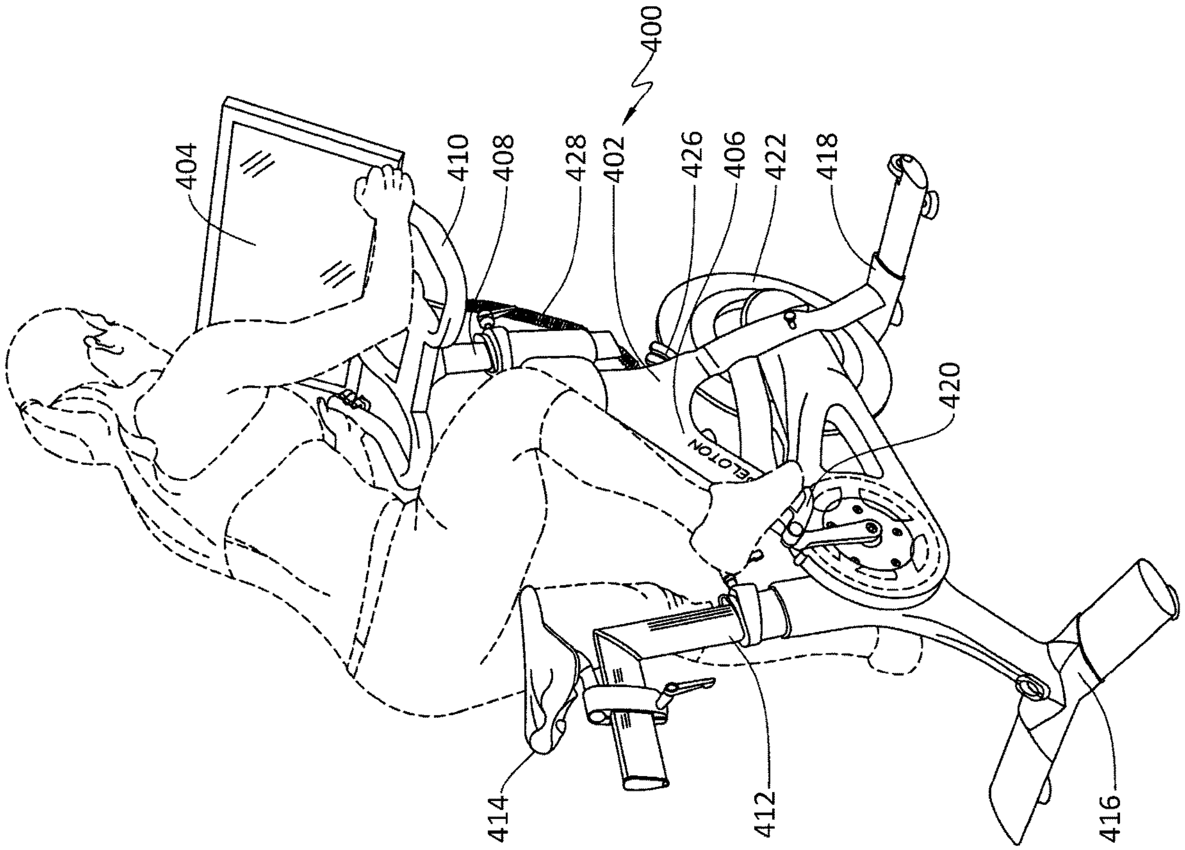

An embodiment of an operation of a content distribution environment for an exercise system will now be described with reference to FIG. 3. The content distribution environment includes a distribution platform 320, which may be implemented as one or more network servers as previously disclosed. The distribution platform 320 facilitates the delivery of digital content (such as media assets 342) to an end user device 304. The user 302 operates the end-user device 304, which may include a touchscreen display 306 that facilitates a client application for communications with a merchant application 332 hosted on a merchant server 330. For example, in one embodiment the client application may allow the user to see available exercise classes, select and customize an available class, and participate in a selected exercise class hosted through the merchant application 332 and the distribution platform 320. The end-user device 304 may be an exercise apparatus (e.g., a stationary bike, a treadmill) and the client application on the touchscreen display 306 provides an interface for accessing exercise related content through the merchant server 330. The exercise related content may include fully produced content such as a pre-recorded audio and/or video content, and/or may incorporate audio and/or video components that are being customized in real time based on certain data provided by the end user and/or by the exercise apparatus.

In the illustrated embodiment, the content provider 340 offers access to media assets 342 through a content host 350. The content host 350 includes a database 352 for storing and accessing the media assets 354. The content provider 350 manages access to the media assets 354 through the distribution platform 320, which includes a database 322 storing content data 324 and subscription data 326. The subscription data 326 organizes media assets into a unique subscription or membership model, whereby multiple subscription plans can be produced and administered on the distribution platform 320. Each such subscription offer can comprise of one or more subscription periods (e.g., daily, weekly, monthly, yearly, 5-year term, per-use, etc.), with each such period carrying its own price, and wherein merchant outlets (e.g., through merchant server 330) provide separate subscription channels.

In various embodiments, multiple subscriptions may be offered by merchants via mobile app or web page, with each merchant controlling its own branding, pricing, and content curation. One or multiple subscriptions may be offered by the distribution platform 320 via API services to be imbedded into one or more merchant's own over-the-top media platform, mobile app or web page. In some embodiments, individual fitness instructors, for example, can curate their own subscription channels.

The user 302 may use the client application (e.g., via touchscreen device 306) to access an application 332 on the merchant server 330 to purchase a subscription and/or sign up for access for merchant content. The user may submit payment 308 (e.g., credit card payment, crypto-currency) through the distribution platform 320, which updates the subscription data 326 to associate the user 302 with the subscription. After the content provider 340 creates the media assets 342 (e.g., an album of music), the media assets 342 may be provided to the content host 350. The media assets 342 are now available to users who meet certain access requirements, such as user who own a subscription through the merchant server 330 and the distribution platform 320. The user 302 may use the client application to download or otherwise access the media assets 310 from the distribution platform 320. In some cases, the end user streams the provided content. In other cases, the provided content may be customized in a dynamic and real time or close to real time rendering fashion based on data inputs from an end user exercise apparatus, related in whole or in part to end user's exercise performance.

Referring to FIGS. 4A-7, example embodiments facilitating the distribution of exercise related content will now be described. Embodiments of the present disclosure allow for efficient management of digital content, including the creation of multiple channels of distribution and payment models. The systems and methods disclosed herein provide numerous advantages to media consumers, content creators and merchants across a wide variety of applications.

In various embodiments, a merchant may access a distribution platform to facilitate the delivery and monetization of digital content. The merchant may curate one or more channels of digital content targeted for different end-user scenarios and set pricing and distribution restrictions for the channel. For example, a merchant may sell an exercise apparatus that includes a display and audio speakers for playing video and audio content. The merchant may offer digital content targeted to users of the merchant's exercise equipment, such as digital content associated with an exercise class led by a class instructor. Using a local application associated with the exercise apparatus, the user may access digital content from the distribution platform. The local application may be associated with the merchant and/or the user, allowing the distribution platform to offer digital content associated with the exercise apparatus and/or the user. In this manner, the user may be provided with targeted digital content options and the merchant can control distribution of digital content to its exercise apparatus users to ensure a quality user experience.

The distribution platform also benefits content creators by facilitating content distribution and monetization. For example, an exercise instructor may offer additional content through his own channel and charge the user for the access on a per-use, subscription or another basis. Through the local application associated with the exercise apparatus, the user can engage exercise instructors though the distribution platform to secure individual coaching, personal training, class instruction and other exercise experiences. The instructor can establish one or more channels of instructor content and establish subscription and other payment models on the distribution platform. In some embodiments, the instructor and merchant establish an association through the distribution platform, allowing the instructor to distribute content through the merchant channel in a manner that may include revenue sharing model.

Although the embodiments illustrate an example with a stationary bike, exercise classes and other exercise related content, it will be appreciated that the present disclosure may be implemented with other exercise equipment and/or other content creation and delivery applications. In various embodiments, local system 400 comprises a stationary bike 402 with integrated or connected digital hardware including at least one display screen 404. The stationary bike 402 may comprise a frame 406, a handlebar post 408 to support the handlebars 410, a seat post 412 to support the seat 414, a rear support 416 and a front support 418. Pedals 420 are used to drive a wheel 422 via a belt, chain, or other drive mechanism. The wheel 422 may be a heavy metal disc or other appropriate mechanism. In various example embodiments, the force on the pedals necessary to spin the wheel 422 can be adjusted using a resistance adjustment knob 424. The resistance adjustment knob may directly or indirectly control a device that increases or decreases the resistance of the wheel to rotation. For example, rotating the resistance adjustment knob clockwise may cause a set of magnets 426 to move relative to the wheel, increasing its resistance to rotation and increasing the force that the user must apply to the pedals to make the wheel spin.

The stationary bike 402 may also include various features that allow for adjustment of the position of the seat 414, handlebars 410, etc. In various example embodiments, a display screen 404 may be mounted in front of the user forward of the handlebars. Such display screen may include a hinge 428 or other mechanism to allow for adjustment of the position or orientation of the display screen relative to the rider.

The digital hardware associated with the stationary bike 402 may be connected to or integrated with the stationary bike 402, or it may be located remotely and wirelessly connected to the stationary bike. The display screen 404 may be attached to the stationary bike or it may be mounted separately but should be positioned to be in the line of sight of a person using the stationary bike. The digital hardware may include digital storage, processing, and communications hardware, software, and/or one or more media input/output devices such as display screens, cameras, microphones, keyboards, touchscreens, headsets, and/or audio speakers. In various example embodiments these components may be integrated with the stationary bike. All communications between and among such components may be multichannel, multi-directional, and wireless or wired, using any appropriate protocol or technology. In various example embodiments, the system may include associated mobile and web-based application programs that provide access to account, performance, and other relevant information to users from local or remote personal computers, laptops, mobile devices, or any other digital device.

In various example embodiments, the stationary bike 402 may be equipped with various sensors that can measure a range of performance metrics from both the stationary bike and the rider, instantaneously and/or over time. For example, the stationary bike may include power measurement sensors such as magnetic resistance power measurement sensors or an eddy current power monitoring system that provides continuous power measurement during use. The stationary bike may also include a wide range of other sensors to measure speed, pedal cadence, wheel rotational speed, etc. The stationary bike may also include sensors to measure rider heart-rate, respiration, hydration, or any other physical characteristic. Such sensors may communicate with storage and processing systems on the bike, nearby, or at a remote location, using wired or wireless connections.

Hardware and software within the sensors or in a separate package may be provided to calculate and store a wide range of performance information. Relevant performance metrics that may be measured or calculated include distance, speed, resistance, power, total work, pedal cadence, heart rate, respiration, hydration, calorie burn, and/or any custom performance scores that may be developed. Where appropriate, such performance metrics can be calculated as current/instantaneous values, maximum, minimum, average, or total over time, or using any other statistical analysis. Trends can also be determined, stored, and displayed to the user, the instructor, and/or other users. A user interface may provide for the user to control the language, units, and other characteristics for the various information displayed.

In various example embodiments the stationary bike 402 may be equipped with one or more large display screens 404, cameras, microphones, and speakers or other audio outputs. The display screen(s) 404 may be mounted directly to the stationary bike 402 or otherwise placed within the viewing area of the user. In various example embodiments, at least one display screen is integrated into or attached to the stationary bike and is positioned in front of the rider generally centered on the handlebars 410 of the stationary bike as illustrated in the figures. Various mechanisms can be used to allow the user to customize the position of the display screen(s).

In an example embodiment, a display screen 404 may be attached to the stationary bike 402 via a curved structure extending up and forward from the front stem of the frame 406. The curved structure may include a slot or aperture through it and extending along a portion of the length of the curved structure. A mounting post or similar structure on the display screen may attach to the curved structure, such as by a pin that passes through the mounting post or structure and the curved structure. In an example embodiment, the pin may have a mechanism such as threads that allow it to be tightened to hold and lock the mounting post or structure at a particular location and position.

Display screen 404 may be driven by a user input device such as a touchscreen, mouse, or other device. In various example embodiments a touchscreen display is mounted on the stationary bike generally centered between the handlebars and located just below the handlebars. The display screen may be any size, but optimally is large enough and oriented to allow the display of a range of information including one or more video streams, a range of performance metrics for the user and others, and a range of different controls.

In various example embodiments the user can use a touchscreen or other interface to selectively present a range of different information on the screen including live and/or archived video, performance data, and other user and system information. The user interface can provide a wide range of control and informational windows that can be accessed and removed individually and/or as a group by a click, touch, or gesture. In various example embodiments, such windows may provide information about the user's own performance and/or the performance of other participants in the same class both past and present.

The user interface can be used to access member information, login and logout of the system, access live content such as live exercise classes and archived content (referred to in the Figures as "Rides on Demand"). User information may be displayed in a variety of formats and may include historical and current performance and account information, social networking links and information, achievements, etc. The user interface can also be used to access the system to update profile or member information, manage account settings such as information sharing, and control device settings.

Figure 5A:
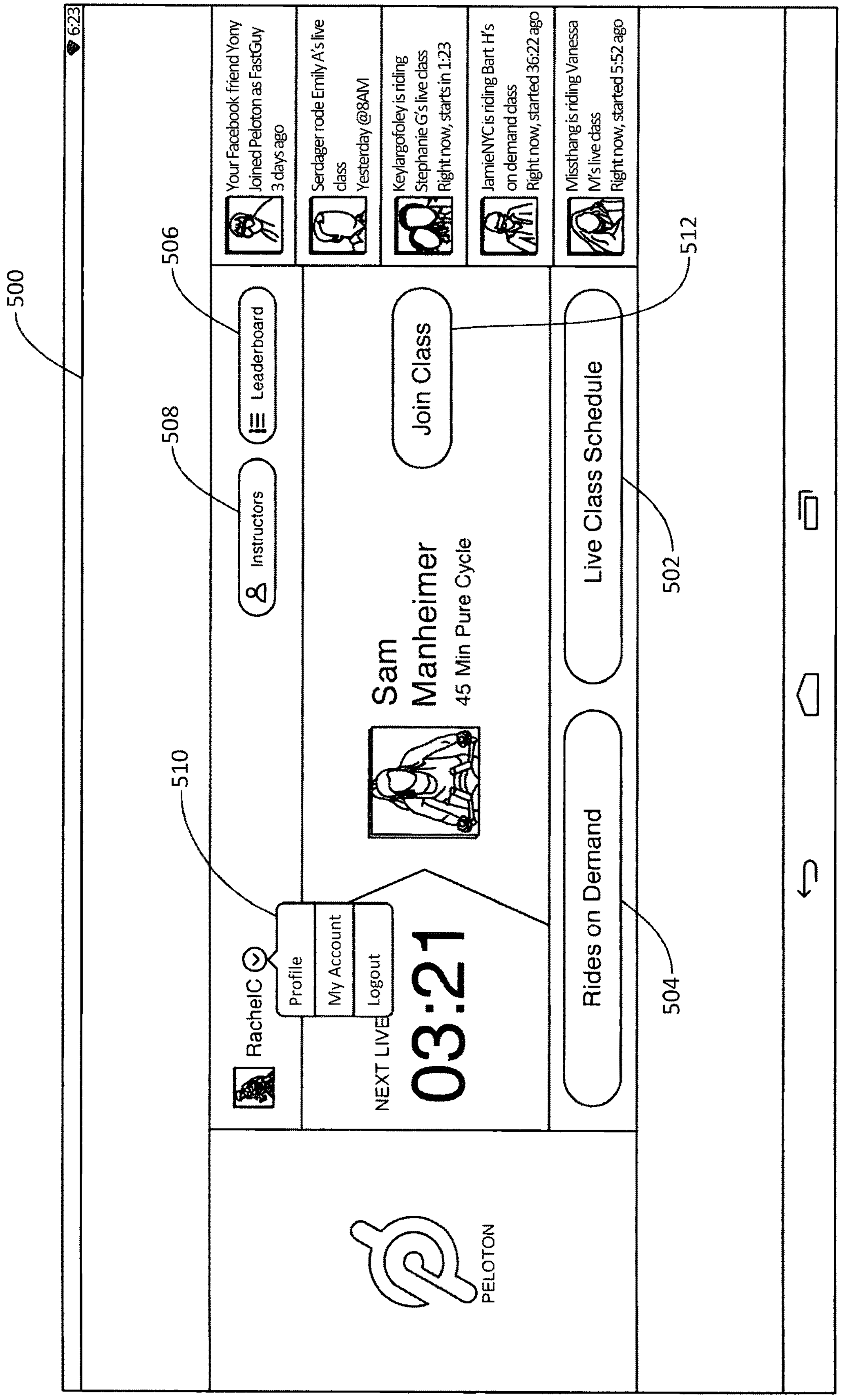
FIGS. 5A, 5B and 5C illustrated example user interface screens for a stationary bike in accordance with an embodiment of the present disclosure.
Figure 5B:
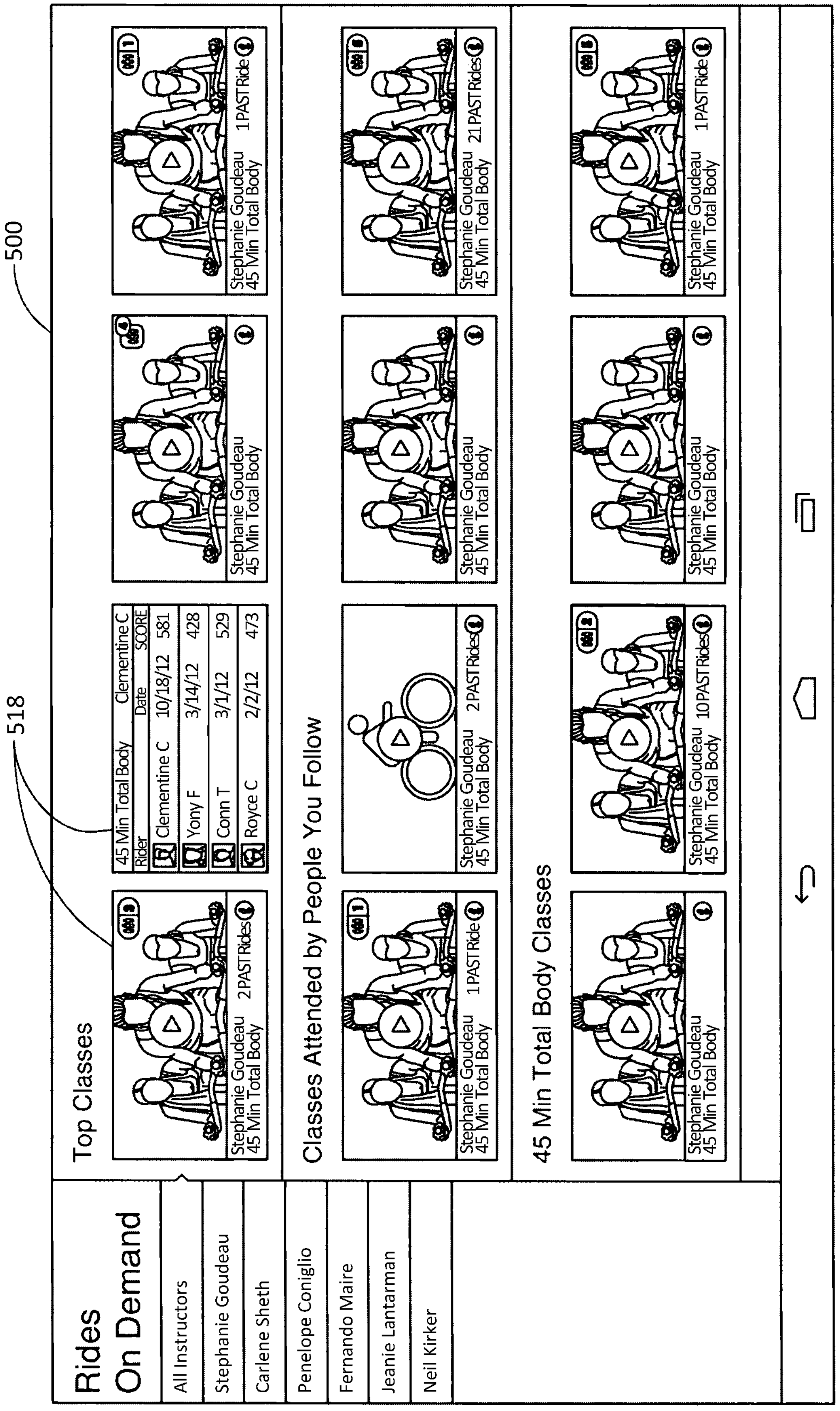
Figure 5C:
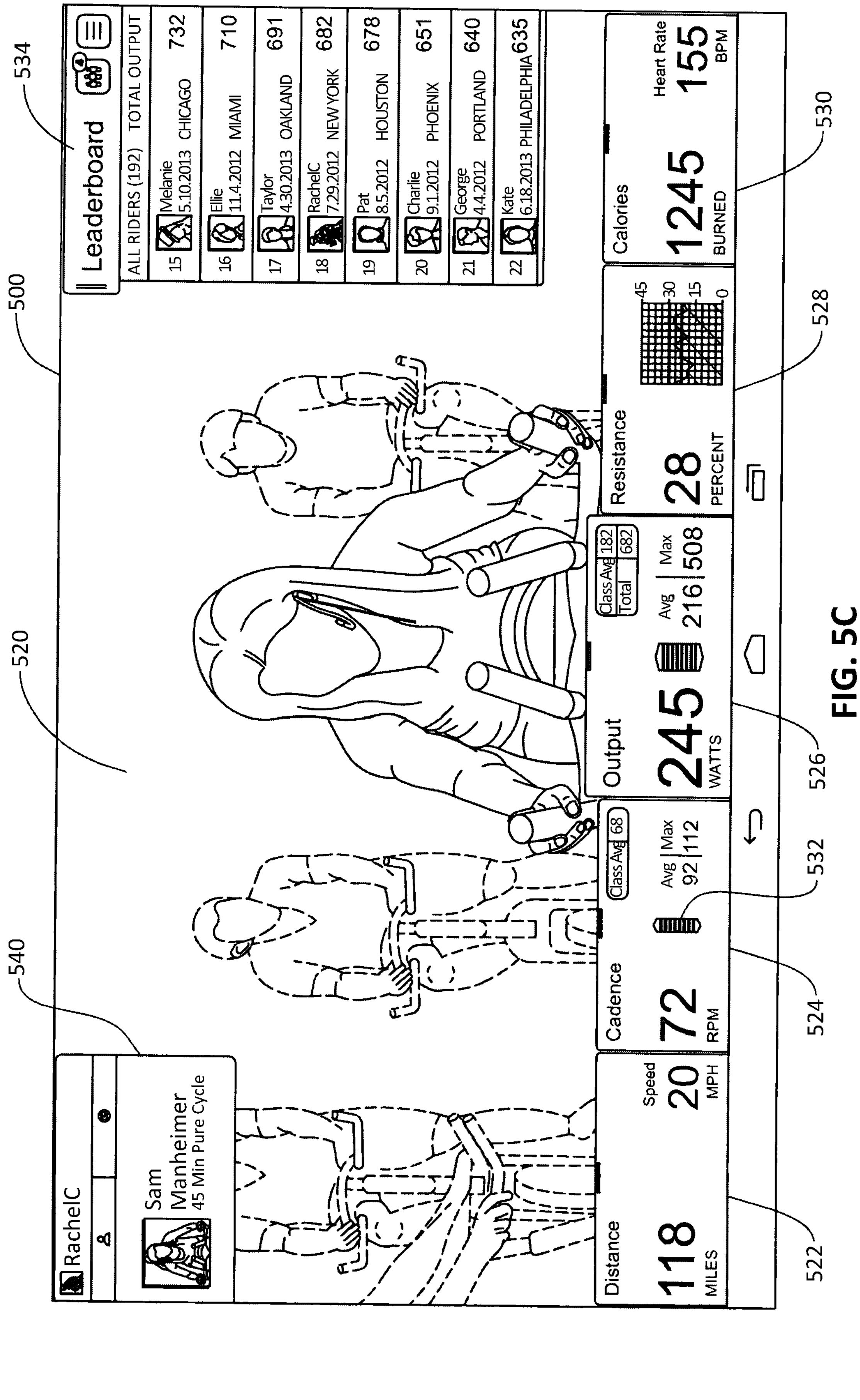

Referring to FIGS. 5A-5C, a user interface 500 may be presented on the display screen 500 to allow the user to manage their experience, including selecting information to be displayed and arranging how such information is displayed on their system. The user interface may present multiple types of information overlaid such that different types of information can be selected or deselected easily by the user. For example, performance information may be displayed over video content using translucent or partially transparent elements so the video behind the information elements can be seen together with the information itself.

The user interface 500 may present a variety of screens to the user, which the user can move among quickly using the provided user input device, including by touching if a touchscreen is used. In various example embodiments, the user interface may provide a home screen that provides basic information about the system and available options. Referring to FIG. 5A, such a home screen may provide direct links to information such as scheduled classes 502, archived classes 504, a leaderboard 506, instructors 508, and/or profile and account information 510. The screen may also provide direct links to content such as a link to join a particular class 512. The user can navigate among the different screens in the user interface by selecting such links using the applicable input device such as by touching the touchscreen at the indicated location, or by swiping to bring on a new screen. The user interface may also provide other information relevant to the user such as social network information, and navigation buttons that allow the user to move quickly among the different screens in the user interface.

In various example embodiments, the user can select among both live and archived content. For example, if the user selects scheduled classes 502, they may be presented with a screen showing the schedule of upcoming classes. The user interface allows users to select classes by time, instructor or rides type and/to start a class that is underway or about to begin. The class schedule may be presented in any suitable format, including calendar, list, or any other appropriate layout.

In various example embodiments, if the user selects archived classes 504, they may be presented with a screen showing available archived classes sorted by any appropriate category. FIG. 5B shows an example display of archived classes. Thumbnails or icons 518 representing archived classes may be displayed in any suitable format and may include information on how many times the user has ridden that class in the past or other performance or class-related information. A class may be accessed by selecting a particular thumbnail or icon.

Referring to FIG. 5C, when a class is being playing on the display screen through the user interface 500, in various example embodiments the primary video feed may be shown as the background video full-screen or in a sub-window on the screen. Information elements may be provided on different parts of the display screen to indicate any performance metrics, including time ridden, elapsed time, time left, distance, speed, resistance, power, total work, pedal cadence, heart rate, respiration, hydration, calorie burn, and/or any custom performance scores that may be developed. The displayed information may also include the trend or relationship between different performance metrics. For example, the display can indicate a particular metric in a color that indicates current performance compared to average performance for a class or over time, such as red to indicate that current performance is below average or green to indicate above average performance. Trends or relative performance can also be shown using color and graphics, such as a red down arrow to show that current performance is below average.

A primary window 520 showing the live or archived class that the user selected. In various example embodiments, performance metric windows 522, 524, 526, 528, and 530 may show specific performance metrics for the user's current ride, past rides, or other performance information. Such performance metric windows may be presented anywhere on the display screen and may be user selectable such that they can be displayed or removed by a screen touch or gesture. As shown in FIG. 5C, window 522 displays distance and speed. Window 524 displays current pedal cadence, along with the user's average and maximum cadence and the class average, and an indicator arrow 532 showing whether the user's cadence is increasing or decreasing. Window 526 shows power output in watts, together with average output, maximum output, class average, and total output, along with a similar indicator arrow. Window 528 shows resistance as both a number and graphically, and window 530 shows calories burned and heart rate.

The user interface may allow the user to toggle between display of maximum, average, and total results for different performance metrics. The user interface may also allow the user to hide or display information elements, including performance metrics, video streams, user information, etc. all at once or individually. Performance information can also be displayed in various display bars that can be hidden or displayed as a group or individually. The user interface may provide for complete controls for audio volume, inputs, and outputs as well as display output characteristics.

A leaderboard 534 may also be displayed to allow the user to see their performance in comparison to others taking the same class. In various example embodiments, a leaderboard may be configured to display the relative performance of all riders, or one or more subgroups of riders. For example, the user may be able to select a leaderboard that shows the performance of riders in a particular age group, male riders, female riders, male riders in a particular age group, riders in a particular geographic area, etc. Users may be provided with the ability to deselect the leaderboard entirely and remove it from the screen. In various example embodiments, the system may incorporate various social networking aspects such as allowing the user to follow other riders, or to create groups or circles of riders. User lists and information may be accessed, sorted, filtered, and used in a wide range of different ways. For example, other users can be sorted, grouped and/or classified based on any characteristic including personal information such as age, gender, weight, or based on performance such as current power output, speed, or a custom score.

The leaderboard 534 may be fully interactive, allowing the user to scroll up and down through the rider rankings, and to select a rider to access their detailed performance data, create a connection such as choosing to follow that rider, or establish direct communication such as through an audio and/or video connection. The leaderboard may also display the user's personal best performance in the same or a comparable class, to allow the user to compare their current performance to their previous personal best. The leaderboard may also highlight certain riders, such as those that the user follows, or provide other visual cues to indicate a connection or provide other information about a particular entry on the leaderboard. In various example embodiments, the leaderboard will also allow the user to view their position and performance information at all times while scrolling through the leaderboard. In various example embodiments, performance information about other users may be presented on the leaderboard 534 or in any other format, including formats that can be sorted by relevant performance parameters. Users may elect whether or not to make their performance available to all users, select users, and/or instructors, or to maintain it as private so that no one else can view it.

In various example embodiments the user interface may also present one or more video streams from a range of different sources. For example, one video stream may be the live or archived class content shown in the primary window, while one or more additional video streams may be displayed in other windows on the screen display 404. The various video streams may include live or recorded streaming instructor video or any other video content, including one or more live video chat streams.

The user interface may also provide additional windows that can be used to display a range of content including additional performance data, information about the class, instructor, other riders, etc., or secondary video streams. Such additional windows can allow the user to see a range of information regarding other current or past participants to compare performance, and open or close voice or video chat streams or other communication channels. In various example embodiments the user can simultaneously access other content including movies, television channels, online channels, etc. A secondary window 540 may display a range of information and content. Secondary window 540 displays the name of the user, the name of the current class and basic class information.

Through the user interface on their stationary bike 402, users may access lists, calendars, and schedules of live and recorded cycling classes available for delivery through the display screen 404. In various example embodiments, once the user selects a class, the local system accesses and displays a primary data stream for the class from the content distribution platform of the present disclosure. This primary data stream may include video, music, voice, text, or any other data, and may represent a live or previously recorded cycling class. The local system may be equipped for hardware video accelerated encoding/decoding to manage high definition video quality at up to 680 pixels based on existing technology. The local system may automatically adjust bitrate/quality of the data stream for the class in order to bring rider the highest quality video according to user's bandwidth/hardware limitations.

In various example embodiments, the networked exercise systems and methods may include multi-directional communication and data transfer capabilities that allow video, audio, voice, and data sharing among all users and/or instructors, and the various components of the content distribution platform of the present disclosure (including a merchant application server and the content provider). This allows users to access and display multi-directional video and audio streams from the instructor and/or other users regardless of location, and to establish direct communications with other users to have private or conferenced video and/or audio communications during live or recorded classes. Such data streams can be established through the local system 400 for presentation via the display screen 404 the primary window or in a secondary window. In various example embodiments, users can manage multiple data streams to select and control inputs and outputs. The local system may allow the user to control the volume of primary audio stream for the class as well as other audio channels for different users or even unrelated audio streams such as telephone calls or their own music selections. For example, this would allow a user to turn down the instructor volume to facilitate a conversation with other users. Such data streams may be mixed with media assets provided from one or more content providers through the content distribution platform.

For live classes, in various example embodiments the instructor may have the ability to communicate with the entire class simultaneously or to contact individual users and solicit feedback from all users regardless of location in real-time. For example, instructors could ask users verbally, or text a pop-up message to users, seeking feedback on difficulty level, music choice, terrain, etc. Users could then respond through their onboard system by selecting an appropriate response or providing verbal feedback. This allows instructors to use crowdsourcing to tailor a class to the needs of the participants, and to improve their classes by soliciting feedback or voting on particular class features or elements.

In various example embodiments, instructors may also be able to set performance targets, and the system can measure and display to the user and the instructor their performance relative to the target. For example, the instructor may set target metrics e.g. target power and cadence, then display this next to users' readings with a color coding to indicate whether or not the user is meeting this target. The system may allow the instructor to remotely adjust bike settings for individual users.

In various example embodiments, users can control access to their own information, including sensor data, performance metrics, and personal information. Such data can be held at the local system, transmitted for storage and management by a remote system and shared with other users, or stored remotely but not shared with other users. Users may also elect to disclose their presence on the system to other users, or to participate in a class without making their presence known to other users. Such data can be securely shared with content generators to generate real time media content in response to the sensor data, performance metrics and other class related information.

In various example embodiments, users can access a list of all or selected current and/or past class participants. Such lists may include performance information for such users, such as total power, speed, cadence, resistance, or a custom score that provides information about relative user performance. Such lists may also include controls to allow the user to open up live streams to the user such as live video chat streams.

System Features and User Resources

In various example embodiments, the networked exercise system and methods may allow users to create accounts and save and manage their performance data. As discussed above, the system may allow users to browse schedules for upcoming live classes, signup for future live streaming classes, and setup reminders. Users may also be able to invite others to participate in a live class, and setup text, email, voice, or other notifications and calendar entries. Users may be able to access system, account, performance, and all other data via web-based or application-based interfaces for desktop and/or mobile devices, in addition to the user interface for the local system 400 associated with their stationary bike 402.

In various example embodiments, the system can provide for simultaneous participation by multiple users in a recorded class, synchronized by the system and allowing access to all of the same communication and data sharing features that are available for a live class. With such a feature, the riders simultaneously participating in the same archived class can compete against each other, as well as against past performances or "ghost" riders for the same class.

In various embodiments, the system may use information provided by the local system to generate new media content in real time. The information may include sensor data, performance metrics of the user and/or class, personal preferences of the user (e.g., music choices), and other data. For example, user selection and/or feedback about a particular music choice may be used to generate new music in a similar style.

Figure 6:
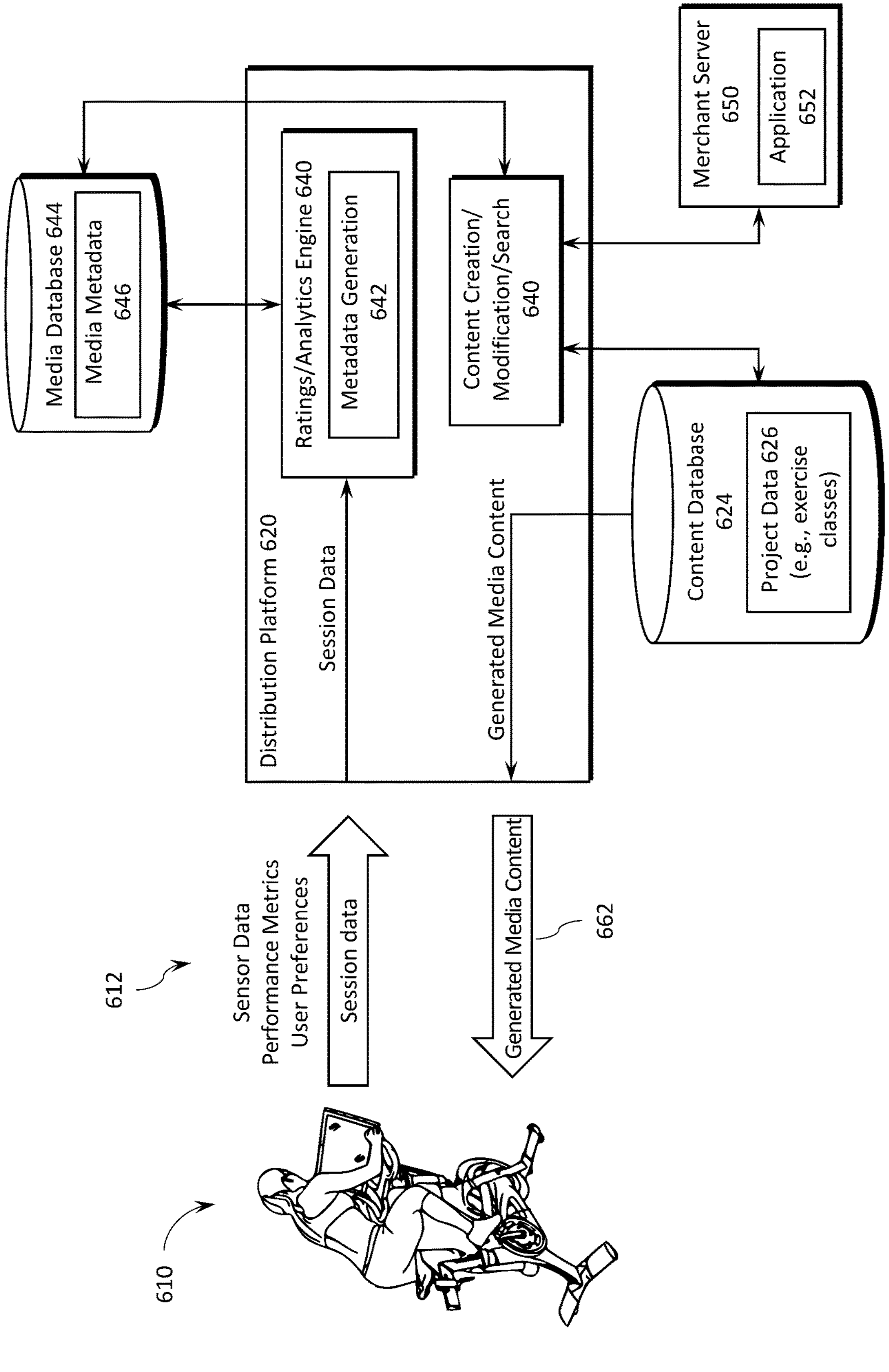
FIG. 6 shows an example data flow for content creation and distribution for a stationary bike, in accordance with an embodiment of the present disclosure.

Additional embodiments of content creation and distribution systems and methods will now be described with reference to FIGS. 6 and 7. Referring to FIG. 6, a local system 610 includes a user operating an exercise apparatus 610 that includes one or more sensors, a processing system that generates one or more performance metrics and/or user preference information. During exercise, the exercise apparatus 610 transmits session data 612 to the distribution platform 620. In various embodiments, the session data 612 may include sensor data (e.g., resistance, cadence, user heartrate), performance metrics (e.g., speed, distance, position on leaderboard), and/or user preference information (e.g., favorite music, workout preferences, etc.). The session data 612 is provided to a ratings/analytics engine 640, which analyzes media stored in the media database 644 and generates media metadata 646 for use by the distribution platform 620, such as for content creation. The ratings/analytics engine 640 includes a metadata generation module 642, which may include one or more machine learning modules (e.g., neural network) to generate the metadata.

In one embodiment, the session data includes user performance information that is compared against generated media content 662 to evaluate the effectiveness of the media during the exercise class. For example, if the user performance information is consistent with the goal of the instructor's exercise segment, then an associated rating may go up, and if the user performance information underperforms the goal of the instructor's exercise segment, then the associated rating may go down. The instructor (e.g., through an application 652 through merchant server 650) may access the updated media content through a content creation/modification/search module 640 when creating an exercise class, modifying an exercise class, and/or searching for an exercise class.

The content creation module 640 uses the updated media metadata 646 to recommend new media content, such as music or video content, for the exercise class. Content database 624 stores project data 626 which may be used by the distribution platform to generate media content for delivery to the exercise apparatus 610. The generated media content 662 may include a mixture of both generated media content and preexisting media content. For example, a video of a class instructor and audio of the class instructor's spoken instructions may be mixed with computer generated music. In this manner, the media content may be regularly evaluated against user performance data, and the associated metadata updated to assist an exercise instructor in identifying effective media for a class.

Figure 7:
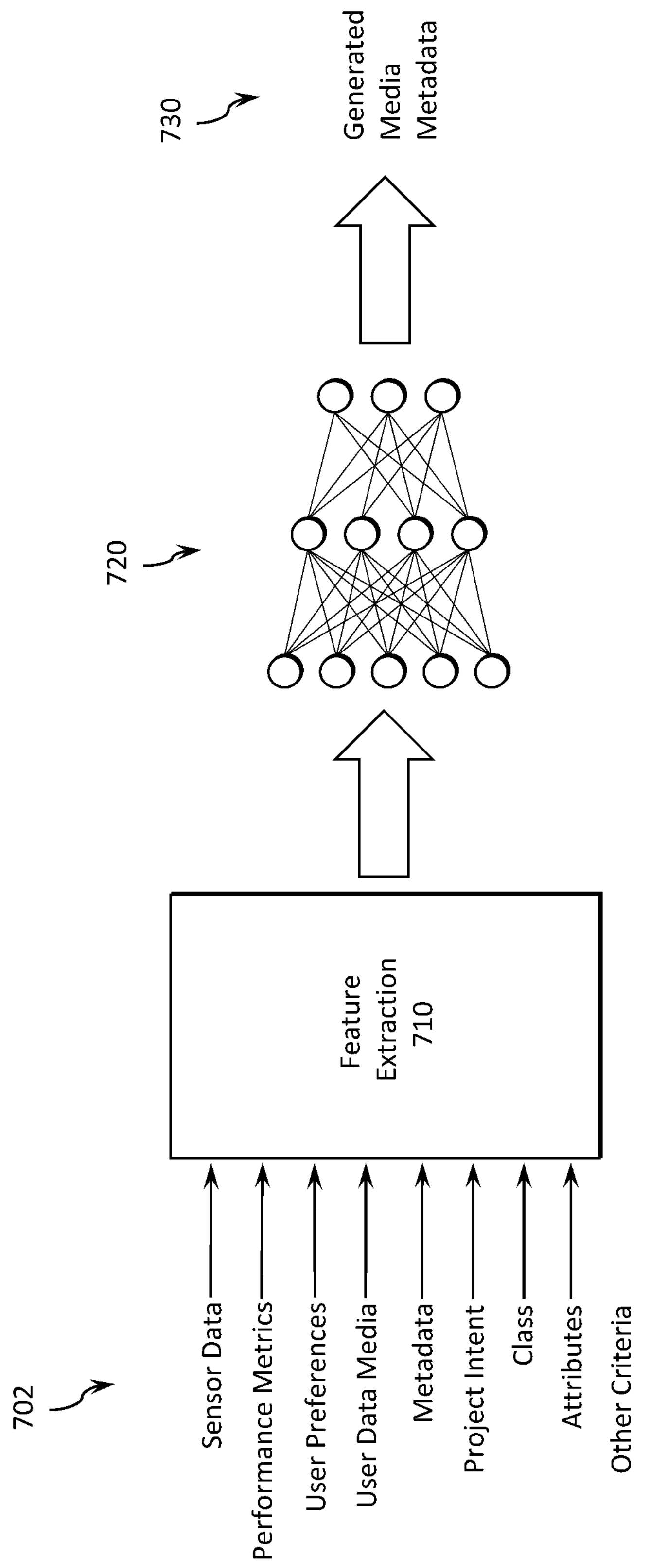
FIG. 7 is an illustration of an example network architecture for use with a stationary bike, in accordance with an embodiment of the present disclosure.

Referring to FIG. 7, an embodiment of performance-based metadata generation will now be described. The metadata generation module 642 receives a stream of data 702 which may be used to generate and/or update the metadata for a media asset. In various embodiments, the input data may include sensor data and performance metrics from the exercise session, user preference data (e.g., a "liked" song) and other user data, media metadata from the media database, project information including an intent of an exercise session, attributes of similar songs, and other criteria. In one embodiment, the data 702 is provided to a feature extraction module 710 which extracts data characteristics used to generate the media metadata. The generated features are provided to a metadata generation system, which may include a trained neural network 720 configured to receive the generated features and output the generated media metadata 730, which may include one or more classifications or ratings for the media.

In operation, a media content creator may establish a channel through the distribution platform as a content creator. The distribution system and/or media content creator may use input from the exercise system and/or user to create music and video creating an artificial reality for the exercise experience. This artificial reality may be mixed with content from the fitness instructor including audio from the fitness instructor, video from the fitness instructor, leaderboard information, etc. The media may be dynamically generated and fed back to the channel for distribution to the local system based, in part, on the generate media metadata.

The systems described herein may be further configured to generate distributed vector representations for users of the system. In one embodiment, workout histories of a plurality of users over fixed timeframe is aggregated, and their positions in the ride leaderboard are analyzed to form temporal sequences. These sequences can be mined to compute co-occurrences between users. The co-occurrence information may be processed using deep-learning embedding techniques (Skipgram with Negative Sampling), Matrix Factorization techniques (CoFocator), or other techniques to derive the users' distributed vector representations. In various embodiments, these vectors may represent the semantics of users, including but not limited to preferred instructor, exercise duration, series, music preferences, and level of fitness. It is recognized that users who frequently appear in similar classes and at similar leaderboard positions may have similar tastes and be at comparable levels of physical fitness. Similar users would have vectors with smaller cosine distance between them, compared to other users.

The use of distributed vector representations for users of the system provides many advantages over conventional approaches which represent users and user selections in terms of discrete, categorical characteristics (e.g., a user's favorite instructor, preferred length of workout, preferred genre of music). By using distributed vector representations, the system may be configured to match riders based on similar leaderboard positions and similar user preferences, select songs that are similar to songs used in a successful class or exercise segment, or personalize class recommendations, for example.

The used of distributed vector representations may also be applied to media in the media database to identify songs that are similar for an intended purpose. For example, the distributed content system can generate and/or recommend songs that are similar to songs in an instructor's class playlist. This can be beneficial, for example, when there are licensing restrictions on a selected song or to keep the playlist fresh for the users. The distributed content system may also identify songs that are liked by similar users (e.g., using the distributed vector representations for user) to the instructor's class participants.

Figure 8A:
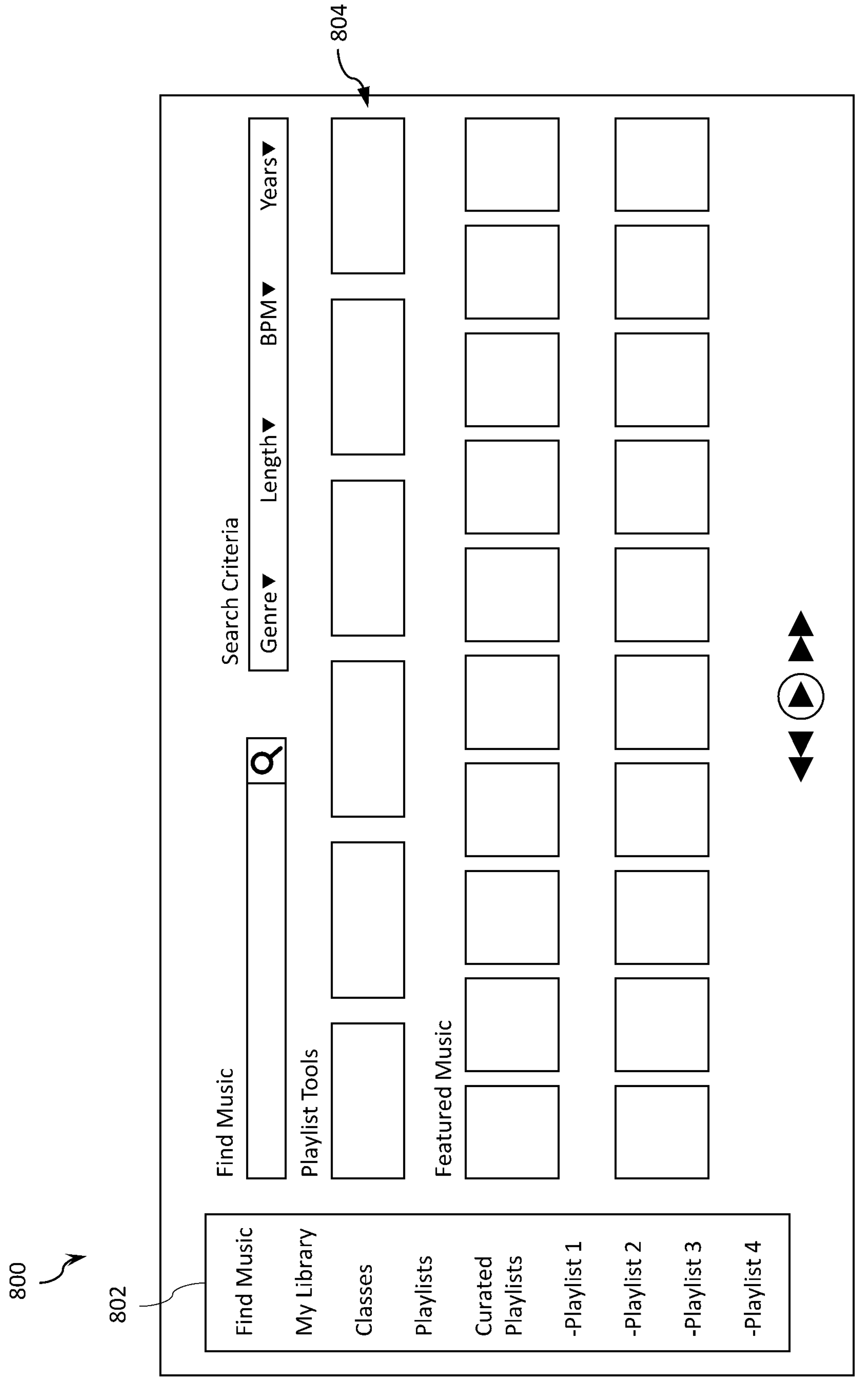
FIGS. 8A, 8B and 8C illustrate example user interfaces for interacting with a music platform, in accordance with an embodiment of the present disclosure.

Referring to FIG. 8A an example user interface 800 is illustrated. The user interface 800 facilitates media content selection, playlist creation, class creation and other features allowing instructors to create and manage exercise class content. For example, the user interface may include features for managing class content 802 and tools 804 for searching for music available through the music database and creating playlists, based on factors such as beats per minute, genre, and length. The user interface 800 may be connected to reporting modules, content management modules, and other modules on the backend for managing the use and distribution of media content.

Figure 8B:
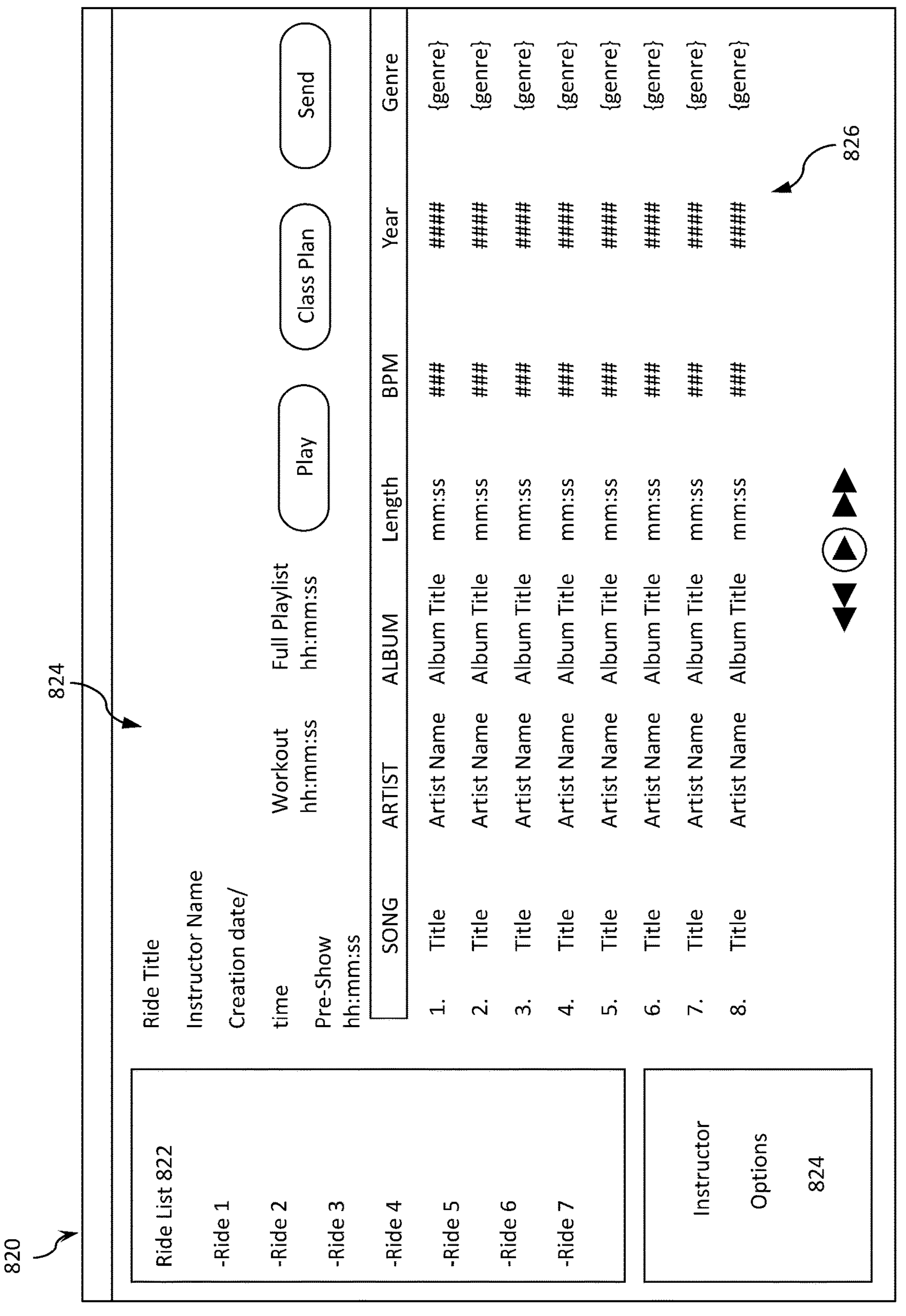
Figure 8C:
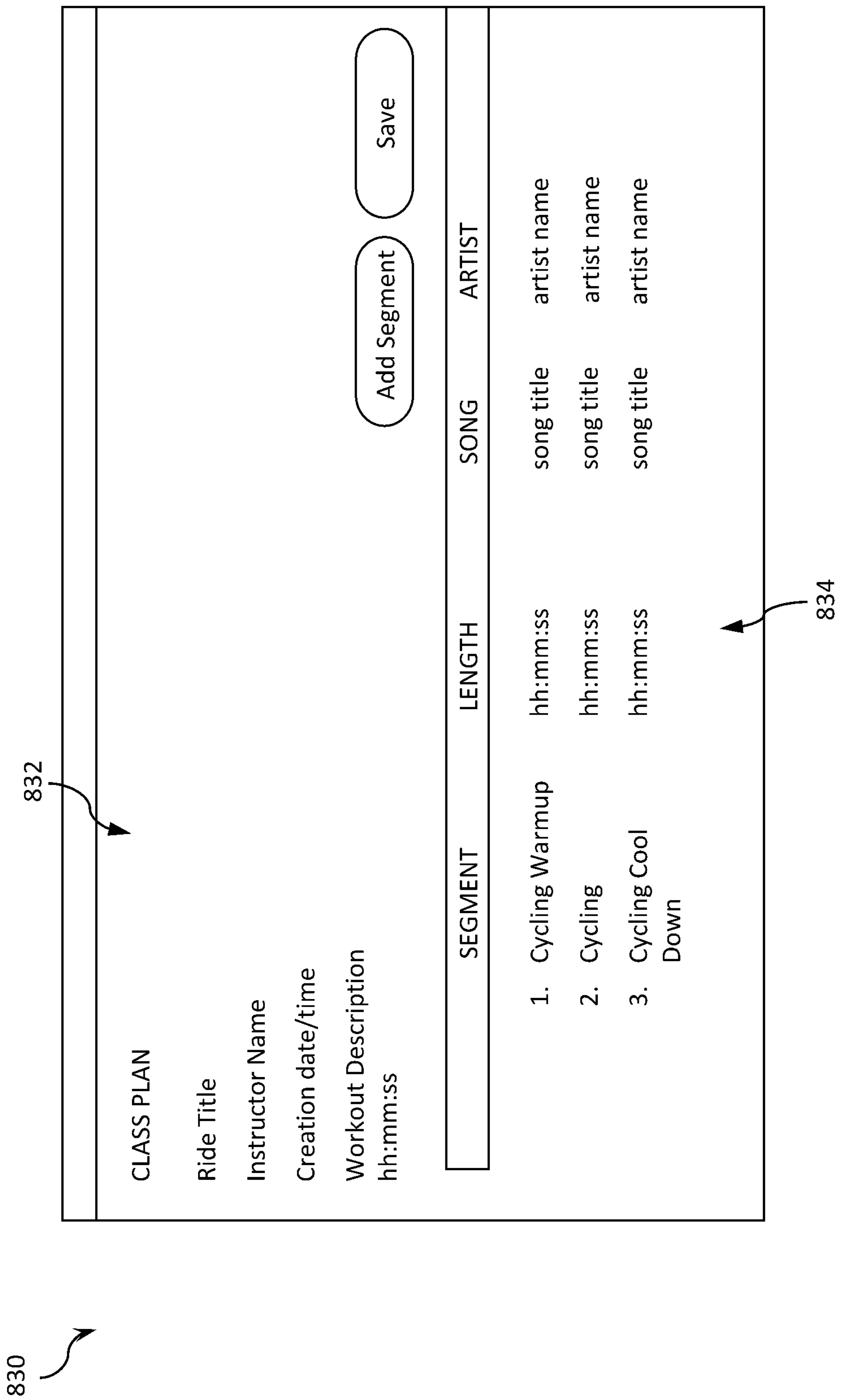

FIG. 8B illustrates a class planning interface 820 for a music platform, in accordance with one or more embodiments. The class planning interface 820 may include a list of curated rides 822, menu options 824 for the instructor to create and manage classes, information for individual rides 824 and a list of songs in the class playlist 826. Referring to FIG. 8C, an interface 830 may be used to create a class, including class description 832, class segments 834 with associated songs. The interface allows the instructor to measure the effectiveness of a song in context of the instructor's intent. In various embodiments, the class planning tool allows for class planning and submission, including timing calculations, segment naming and class participant data collection. The music/content search may include fitness related search criteria, sorting and filtering, including beats-per-minute, genre, length, year.

Referring to FIGS. 9A-B, examples of song-level metadata for use with one or more embodiments of the exercise systems and music platforms of the present disclosure will now be described. Song files 900 are delivered to the music platform by content owners (e.g., music labels) with embedded data including ownership information (ISRC), genre, some timing and/or other elements. The music platform stores the song 900, including a digital audio file 902 and metadata added by the distributor 904. The music platform adds additional metadata, including analytic handles 906 (e.g., data for use in an exercise environment) and publishing information for rights managements. Additional metadata can be added by the platform 908 to rate the suitability of each song for programming against an instructor's specific intended outcome. In some embodiments, the metadata may further include application specific metadata 910 which may be based on end-user engagement during an exercise session, allowing the platform to tune song ratings based on continued observation of effectiveness versus intent.

FIG. 9B illustrates an example of application specific metadata 910 for use in a fitness class application. The meta data includes fitness categories 920 and corresponding ratings 922 rating an effectiveness of the song for use in the identified fitness category. The metadata may be used in a search application, machine learning application, or other application to assist an instructor in selecting effective music and other digital content for an exercise class. In this manner, an instructor generates a playlist and class segments in parallel. The music selection can be tied to a particular segment, reflecting an instructor's intent (e.g., intense music for intense exercise segments, relaxing music for a cool down segment, etc.). The playlist and segment data together may comprise a class plan that is ingested into the content management server. When an end-user engages in a class session, every song and segment is known to the distribution platform. The output of each end-user may be measured along with other session data for comparison against instructor intent. In some embodiments, this data is used to construct a rating identifying a relative appropriateness of the song selection against the instructor's intent for the segment. The system may provide the instructor with feedback on who each segment is performing and/or suggest alternative songs and segment adjustments.

The ratings of the songs deployed in the system can be continually & recursively tuned based on live data feedback from end-users. Further leverage over this data can be achieved through a "confidence" checksum, providing handles for weighting based on statistical significance. Songs that achieve high confidence rankings can be further analyzed and assumptions about specific characteristics driving effectiveness can be derived, tested and refined. The system can then analyze and apply presumptive rankings against its broader library, including songs that have never been programmed and new releases. This proprietary data could be rented or sold in applications for third-party fitness service providers, artists or music rights holders, if desired.

In some embodiments, the generated media content allows for a personalized content package that is controlled by content creators. The distribution platform can separately track and manage the content, including artificially created content. The generated content can also change dynamically based on leaderboard information, data from other users, data from the instructor and other sources during the exercise session. In some embodiments, a content creator composes music through an artificial intelligence system that receives data such as speed, resistance and heartbeat from the user and generates media content corresponding to the exercise session. For example, the speed of a song in beats per minute can change in response to the user's pedal cadence. Video content can be modified in a similar manner.

In some embodiments, the user can select content from different services, and the distribution platform can seamlessness mix the content together for distribution to the local system. For example, a user can initiate a scenic ride with stock video, while music is generated dynamically based on data from the exercise session.

It will be appreciated that the content generation and distribution system disclosed herein may be used for other applications besides exercise sessions. For example, a patient may subscribe to a channel offering content for physical therapy, with access to a sequence of content (e.g., stages of physical recovery) managed through subscriptions. The distribution system may match the user to a content creator and/or make recommendations. The subscription services disclosed herein can facilitate a therapist/patient relationship, allowing the content provider (e.g., doctor or therapist) to track progress and use, including sensor feedback, camera feedback, etc. In another example, the content generation and distribution system may be used in an educational environment, providing instruction to the user in a controlled sequence of videos.

In various example embodiments, the system may include a unique identifier on each bike to allow the system or user to track metrics on bike. This information could be used to user identification, or for maintenance, location, etc. In various example embodiments, the system may also be configured to provide for closed classes. This would allow for a private instructor to work with an individual or small group, or for a group of users to ride together with or without an instructor.

In various example embodiments, users can log in and/or access the system and account information via any appropriate communication technology including without limitation NFC, Bluetooth, WAN, etc. Users can also be provided with a cardkey, FOB, or other device or the stationary bike can be provided with facial recognition or voice recognition technology that automatically logs the user in and accesses their account information. Users can login from their home stationary bike or from any other bike that can access the system. Thus, while traveling a user can still access their complete account history, all content, and all features from any networked stationary bike such as at a hotel, a gym, or a cycling studio in a different location.

In various example embodiments, a mobile application may allow users on non-networked stationary bikes to access the system via a mobile digital device such as a tablet computer or mobile phone and access content, live streams, and other system features. The mobile device could access the system via any appropriate network using a dedicated application or browser.

In various example embodiments, one or more secondary display screens may be used by the system to display content for the exercise class. Using an integrated device such as a tablet to enable it to display content provided by the system through the user interface, a secondary display screen may be used to display content for the exercise class or other content provided by the system. The user interface could automatically detect the availability of such an enabled device and allow the user to select the display screen for particular content.

While the above description contains many specifics, these specifics should not be construed as limitations on the scope of the disclosure, but merely as examples of the disclosed embodiments. Those skilled in the art will envision many other possible variations that fall within the scope and spirit of the disclosure. For example, although an exercise apparatus is illustrated it will be appreciated that the disclosed apparatus is one of many possible end-user platforms, and that the exercise bike is an example of one of many possible exercise equipment options. In various embodiments, various data inputs from a device or set of connected devices may include, but are not limited to, speed, resistance, heart rate, location temperature, location (on the map), location light/dark, as well as known history about the end user (e.g., likes and dislikes, such as music genre likes and artist preferences. Such data may play a function in customizing the content served by the system to the end user in real time or close to real time rendering, may it be pre-packaged on-demand content recommendation or the actual rendering or modification of content itself in response to such input. All such content and functionality may fit into a channel subscription of the digital content distribution systems and methods disclosed herein.

Example Systems and Methods

In one example, an exercise content distribution system for delivering exercise content to a first user of an exercise apparatus for computer-augmented use at home, the system comprises a database storing the exercise content and data associated with a content provider and an application provider, and a platform server operable to facilitate delivery of the exercise content to the exercise apparatus, the platform server configured to deliver for display on the exercise apparatus a plurality of available archived exercise classes for selection by the first user, receive from the exercise apparatus, a selection of one of the available archived exercise classes, transmit, for display on the exercise apparatus, data representing content of the selected archived exercise class, receive performance data from the exercise apparatus, the performance data based on activity by the first user when the first user causes a movement of a portion of the exercise apparatus during the selected archived exercise class, and including a first user performance parameter, generate archived performance data representing archived user performance parameters for a plurality of other users over at least the portion of the selected archived exercise class, wherein the archived performance data was previously generated by the first user and/or one or more other users while participating in the archived exercise class, synchronize the archived performance data so that the archived user performance parameters represented by the archived performance data are synchronized with the first user performance parameter, and dynamically update a ranked list of the first user performance parameter and at least some of the synchronized archived user performance parameters for display by the exercise apparatus, to thereby simulate the first user competing with at least some of the other users.

In some embodiments of the system, performance data includes sensor data, user performance metrics and/or user preference data, and wherein the platform server is further configured to, forward the performance data to the content provider, receive updated content associated with the exercise class from the content provider in response to the performance data, and deliver the updated content to the exercise apparatus. The system may further be modified such that updated content associated with the exercise class includes computer-generated, or computer-modified, media content generated from the performance data through a neural network, or a combination of pre-existing content and computer-generated or computer modified media generated and combined from the performance data through a neural network. In some embodiments, the exercise content includes computer-generated content comprising computer generated music and/or computer-generated video, wherein the computer-generated content is generated in realtime during transmission of the selected archived exercise class, and wherein the computer-generated content changes in response to changes in the performance data, including cadence, speed and/or heartrate data.

In some embodiments, the exercise content of the content provider includes exercise class content including audio cues from an exercise instructor and video content of the exercise instructor and/or scenery. The content associated with the selected archived exercise class may be delivered to end-user by the application provider through an application facilitating the selected archived exercise class running on an application server, and the application facilitating the selected archived exercise class generates session content for delivery to end-user with the exercise content. The platform server may be further operable to maintain content restriction data relating to the stored exercise content, the content restriction data including access parameters received from an associated content provider, generate a plurality of channels, each channel having channel characteristics associated with an application server and/or content provider and defining at least one media asset, process a subscription request from an end-user for one of the plurality of channels, wherein a subscription is granted to the end-user satisfies the content restriction data and channel characteristics, and deliver channel media assets to the exercise apparatus in accordance with the subscription.

The platform server may be further configured to process a payment from the end-user in accordance with the subscription request and allocate a portion of the payment among an account associated with the application server and the content provider, in accordance with the access parameters, the channel characteristics and/or the subscription. The database may include data organized by a subscription model, including multiple subscription plans defined by content providers and/or application servers that are produced, syndicated and administered by the platform server as subscription media channels.

In various embodiments, a method for delivering exercise content to a first user of an exercise apparatus for computer-augmented use at home, the method comprises storing the exercise content and data associated with a content provider and an application provider, and facilitating delivery of the exercise content to the exercise apparatus, including delivering for display on the exercise apparatus a plurality of available archived exercise classes for selection by the first user, receiving from the exercise apparatus, a selection of one of the available archived exercise classes, transmitting, for display on the exercise apparatus, data representing content of the selected archived exercise class, receiving performance data from the exercise apparatus, the performance data based on activity by the first user when the first user causes a movement of a portion of the exercise apparatus during the selected archived exercise class, and including a first user performance parameter, generating archived performance data representing archived user performance parameters for a plurality of other users over at least the portion of the selected archived exercise class, wherein the archived performance data was previously generated by the first user and/or one or more other users while participating in the archived exercise class, synchronizing the archived performance data so that the archived user performance parameters represented by the archived performance data are synchronized with the first user performance parameter, and dynamically updating a ranked list of the first user performance parameter and at least some of the synchronized archived user performance parameters for display by the exercise apparatus, to thereby simulate the first user competing with at least some of the other users.

In some embodiments, the method may further comprise media assets having a format compatible with the exercise apparatus and including content associated with an exercise session for the exercise apparatus, receiving session data from the exercise apparatus, the session data including sensor data, user performance metrics and/or user preference data, forwarding the session data to a content provider, receiving updated content associated with the exercise session from the content provider in response to the session data, and delivering the updated content to the exercise apparatus. In some embodiments, the updated content associated with the exercise session includes computer-generated media content, and/or computer-augmented media content, generated from the session data through a neural network.

In some embodiments of the method, computer-generated and/or computer-augmented media content includes computer-generated music and/or computer-generated video, or computer-augmented music and/or computer-augmented video, wherein the computer-generated content is generated in real-time during the exercise session, and wherein the computer-augmented content is augmented in real-time during the exercise session, wherein the computer-generated and/or computer-augmented content changes in response to changes in the session data, including but not limited to cadence, speed, length, temperate, location, light, and/or heartrate data, and wherein the computer-generated and/or computer-augmented content changes in response to past session data, including end user set preferences, end user selected songs, playlists and genres, and/or end user historic exercise session performance data.

In some embodiments of the method, the media assets of the content provider include exercise class content including audio cues from an exercise instructor and video content of the exercise instructor and/or scenery. The content associated with the exercise session may be delivered to end-user by an application server through an application facilitating the exercise session, and wherein the application facilitating the exercise session generates session content for delivery to end-user with the media assets. The method may further comprise storing information relating to media assets, application servers, content providers and end-users, facilitating distribution of media assets from the content providers to the application servers and end-user devices, including maintaining content restriction data relating to the stored media assets, the content restriction data including access parameters received from an associated content provider, generating a plurality of channels, each channel having channel characteristics associated with an application server and/or content provider and defining at least one media asset, processing a subscription request from an end-user for one of the plurality of channels, wherein a subscription is granted to the end-user satisfies the content restriction data and channel characteristics, and delivering channel media assets to the end-user in accordance with the subscription.

In some embodiments, the method may further comprise processing a payment from the end-user in accordance with the subscription request and allocating a portion of the payment among an account associated with the application server and the content provider, in accordance with the access parameters, the channel characteristics and/or the subscription. Storing information may include organizing data by a subscription model, including multiple subscription plans defined by content providers and/or application servers that are produced, syndicated and administered by a platform server as subscription media channels.

In various embodiments, a content distribution system providing media content to a user of an exercise apparatus, the content distribution system comprises a media database storing the media content, data associated with a content provider, and data associated with an application provider, a content management server configured to receive a media asset request from the user of the exercise apparatus associated with project and distribute the requested media asset in accordance with parameters established by content owners and compatible with the exercise apparatus, and a content distribution platform communicably coupled to the media database and configured to facilitate creation and delivery of the media content to the exercise apparatus.

In some embodiments, a method for delivering exercise content to a user of an exercise apparatus, the method comprises storing, in a media database, media content, data associated with a content provider, and data associated with an application provider, receiving, through a content management server, a media asset request from the user of the exercise apparatus associated with project and distribute the requested media asset in accordance with parameters established by content owners and compatible with the exercise apparatus, and facilitating creation and delivery of the media content to the exercise apparatus through a content distribution platform communicably coupled to the media database.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A content distribution system providing media content to a user of an exercise apparatus, the content distribution system comprising:

a media database storing the media content, data associated with a content provider, and data associated with an application provider;

a content management server configured to receive a media asset request from the user of the exercise apparatus associated with a media project and distribute the requested media asset in accordance with parameters established by content owners and compatible with the exercise apparatus; and a content distribution platform communicably coupled to the media database and configured to facilitate delivery of the media content to the exercise apparatus;

wherein the content distribution platform facilitates clearance of media rights to the media content, creation of the media project for access by the user through the exercise apparatus, and tracking and reporting of the media content used for the media project, and wherein the content distribution platform is configured to:

transmit, for display by the exercise apparatus, data representing content of a selected exercise class;

receive performance data from the exercise apparatus, the performance data including a user performance parameter and based on activity by the user when the user causes a movement of a portion of the exercise apparatus during the selected exercise class;

access archived performance data representing archived user performance parameters for other users of the selected exercise class, wherein the archived performance data was previously generated by the other users while participating in the selected exercise class;

synchronize the archived performance data with the performance data from the exercise apparatus; and cause the exercise apparatus to display a dynamically updating ranked list that contains the performance data from the exercise apparatus synchronized with the archived performance data.

2. The content distribution system of claim 1, further comprising an interface to media rights management services, which are configured to track and collect royalties.

3. The content distribution system of claim 1, wherein the media database stores associated metadata for music content allowing a search for appropriate music content; and wherein the metadata includes a territorial restriction on one or more requested digital media assets.

4. The content distribution system of claim 1, wherein information regarding territorial restrictions is provided to the content distribution platform by the content owner.

5. The content distribution system of claim 1, wherein the content distribution platform is configured to:

deliver, for display on the exercise apparatus, available archived exercise classes for selection by the user.

6. The content distribution system of claim 1, wherein the performance data comprises sensor data, user performance metrics, or user preference data; and wherein the content distribution platform is further configured to forward the performance data to the content provider, receive updated content associated with the selected exercise class from the content provider in response to the performance data, and deliver the updated content to the exercise apparatus.

7. The content distribution system of claim 6, wherein the updated content associated with the exercise class comprises computer-generated or computer-modified media content generated from the performance data through a neural network; and wherein the updated content associated with the selected exercise class comprises a combination of pre-existing content and computer-generated or computer modified media generated and combined from the performance data through a neural network.

8. The content distribution system of claim 1, wherein the selected exercise content comprises computer-generated content includes computer generated music or computer-generated video; wherein the computer-generated content is generated in real-time during transmission of the selected exercise class; and wherein the computer-generated content changes in response to changes in the performance data.

9. The content distribution system of claim 1, wherein the exercise content of the content provider comprises exercise class content including audio cues from an exercise instructor and video content of the exercise instructor, or scenery.

10. The content distribution system of claim 1, wherein the content associated with the selected exercise class is delivered to the user by the application provider through an application facilitating the selected exercise class running on an application server.

11. A method performed by a content distribution platform communicably coupled to a media database and configured to facilitate delivery of media content to an exercise apparatus, the method comprising:

transmitting, for display by the exercise apparatus, data representing content of a selected exercise class;

receiving performance data from the exercise apparatus, the performance data including a user performance parameter and is based on activity by a user of the exercise apparatus when the user causes a movement of a portion of the exercise apparatus during the selected exercise class;

accessing archived performance data representing archived user performance parameters for other users of the selected exercise class, wherein the archived performance data was previously generated by the other users while participating in the selected exercise class;

synchronizing the archived performance data with the performance data from the exercise apparatus; and causing the exercise apparatus to display a dynamically updating ranked list that contains the performance data from the exercise apparatus synchronized with the archived performance data.

12. The method of claim 11, wherein the performance data comprises sensor data, user performance metrics, or user preference data, the method further comprising:

forwarding the performance data to a content provider;

receiving updated content associated with the selected exercise class from the content provider in response to the performance data; and delivering the updated content to the exercise apparatus.

13. The method of claim 12, wherein the updated content associated with the exercise class comprises computer-generated or computer-modified media content generated from the performance data through a neural network.

14. The method of claim 11, wherein the selected exercise content comprises computer-generated content including computer generated music or computer-generated video;

and wherein the computer-generated content is generated in real-time during transmission of the selected exercise class.

15. A non-transitory, computer-readable medium whose contents, when executed by a content distribution platform configured to facilitate delivery of media content to an exercise apparatus, causes the content distribution platform to perform a method, the method comprising:

transmitting, for display by the exercise apparatus, data representing content of a selected exercise class;

receiving performance data from the exercise apparatus, the performance data including a user performance parameter and is based on activity by a user of the exercise apparatus when the user causes a movement of a portion of the exercise apparatus during the selected exercise class;

accessing archived performance data representing archived user performance parameters for other users of the selected exercise class, wherein the archived performance data was previously generated by the other users while participating in the selected exercise class;

synchronizing the archived performance data with the performance data from the exercise apparatus; and causing the exercise apparatus to display a dynamically updating ranked list that contains the performance data from the exercise apparatus synchronized with the archived performance data.

16. The non-transitory, computer-readable medium of claim 15, wherein the performance data comprises sensor data, user performance metrics, or user preference data, the method further comprising:

forwarding the performance data to a content provider;

receiving updated content associated with the selected exercise class from the content provider in response to the performance data; and delivering the updated content to the exercise apparatus.

17. The non-transitory, computer-readable medium of claim 16, wherein the updated content associated with the exercise class comprises computer-generated or computer-modified media content generated from the performance data through a neural network.

18. The non-transitory, computer-readable medium of claim 15, wherein the selected exercise content comprises computer-generated content including computer generated music or computer-generated video; and wherein the computer-generated content is generated in real-time during transmission of the selected exercise class.

* * * * *